US009914222B2

(12) United States Patent
Suzuki et al.

(10) Patent No.: US 9,914,222 B2
(45) Date of Patent: Mar. 13, 2018

(54) INFORMATION PROCESSING APPARATUS, CONTROL METHOD THEREOF, AND COMPUTER READABLE STORAGE MEDIUM THAT CALCULATE AN ACCURACY OF CORRESPONDENCE BETWEEN A MODEL FEATURE AND A MEASUREMENT DATA FEATURE AND COLLATE, BASED ON THE ACCURACY, A GEOMETRIC MODEL AND AN OBJECT IN AN IMAGE

(71) Applicant: CANON KABUSHIKII KAISHA, Tokyo (JP)

(72) Inventors: Tatsuya Suzuki, Tokyo (JP); Masakazu Fujiki, Kawasaki (JP); Kazuhiko Kobayashi, Yokohama (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 15/010,005

(22) Filed: Jan. 29, 2016

(65) Prior Publication Data
US 2016/0232654 A1 Aug. 11, 2016

(30) Foreign Application Priority Data

Feb. 5, 2015 (JP) ................................. 2015-021488
Dec. 11, 2015 (JP) ................................. 2015-242643

(51) Int. Cl.
G06K 9/36 (2006.01)
B25J 9/16 (2006.01)
G06T 7/73 (2017.01)

(52) U.S. Cl.
CPC ............... *B25J 9/1697* (2013.01); *G06T 7/75* (2017.01); *G05B 2219/40543* (2013.01);
(Continued)

(58) Field of Classification Search
CPC ... G06T 7/75; G06T 2207/30164; G06T 7/13; G06T 7/586; G06T 2219/2004
See application file for complete search history.

(56) References Cited

U.S. PATENT DOCUMENTS 5,969,725 A 10/1999 Fujiki et al.
6,717,586 B2 4/2004 Fujiki
(Continued)

OTHER PUBLICATIONS

Drummond,Tom and Roberto Cipolla. "Real-Time Visual Tracking of Complex Structures," IEEE Transactions on Pattern Analysis and Machine Intelligence, vol. 24, No. 7, 2002, pp. 932-946.
(Continued)

*Primary Examiner* — Brian P Werner
(74) *Attorney, Agent, or Firm* — Fitzpatrick, Cella, Harper & Scinto

(57) ABSTRACT

An information processing apparatus predicts, based on a geometric model of an object to be measured, an image degradation of the object in an image in which the object is captured by a capturing device. Furthermore, the information processing apparatus searches a two-dimensional image in which the object is captured by the capturing device for a measurement data feature that corresponds to a model feature of the geometric model, and evaluates, using the two-dimensional image, an image degradation with respect to the found measurement data feature. The information processing apparatus calculates, based on the predicted image degradation and the evaluated image degradation, the accuracy of the correspondence between the model feature and the measurement data feature, and collates, based on this accuracy, the geometric model and the object in the two-dimensional image.

19 Claims, 11 Drawing Sheets

(52) U.S. Cl.
CPC .............. *G06T 2207/30164* (2013.01); *G06T 2207/30168* (2013.01); *Y10S 901/09* (2013.01)

(56) References Cited

U.S. PATENT DOCUMENTS

| | | |
|---|---|---|
| 6,930,685 B1 | 8/2005 | Sakagawa et al. |
| 7,312,795 B2 | 12/2007 | Aso et al. |
| 2005/0190181 A1 | 9/2005 | Sakagawa et al. |
| 2005/0195332 A1 | 9/2005 | Sakagawa et al. |
| 2013/0158947 A1 | 6/2013 | Suzuki |
| 2013/0230235 A1* | 9/2013 | Tateno ................ G06T 7/75 382/154 |
| 2015/0002662 A1 | 1/2015 | Furihata et al. |
| 2016/0203367 A1* | 7/2016 | Oami ............ G06K 9/00711 382/103 |

OTHER PUBLICATIONS

Tsai, Roger Y. "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, 1987, pp. 323-344.

Baba, Masahsi, et al. "Calibrated Compute Graphics: A New Approach to Image Synthesis Based on Camera calibration," Transactions of Information Processing Society of Japan, vol. 39, No. 7, 1998, pp. 2180-2188.

Hel-Or, Yacov and Michael Werman. "Pose Estimation by Fusing Noisy Data of Different Dimensions," IEEE Transactions on Pattern Analysis and Machine Intelligence, vol. 17, No. 2, 1995, pp. 195-201.

\* cited by examiner

MODEL EDGE FEATURE

MODEL SURFACE FEATURE

OBJECT GEOMETRY

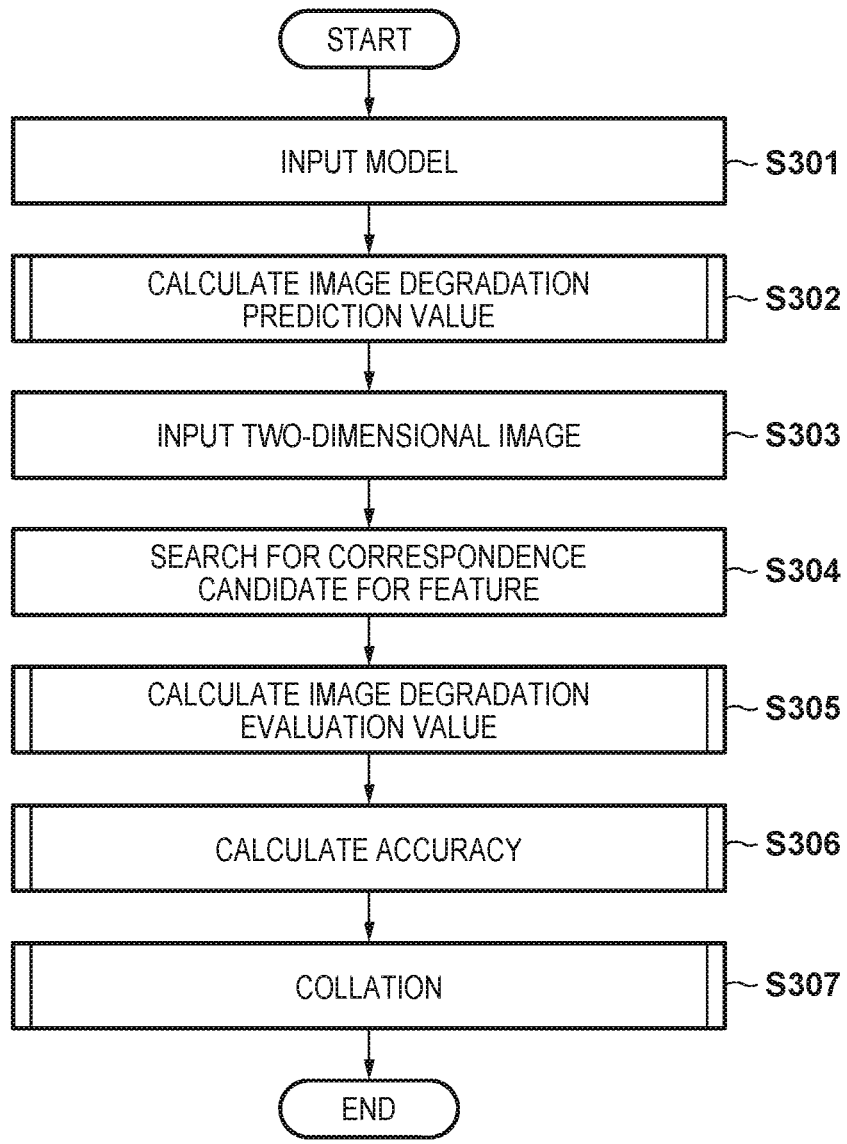

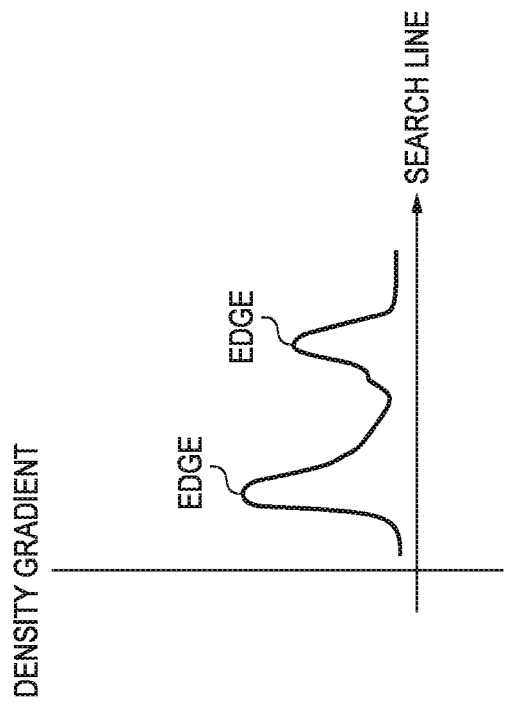
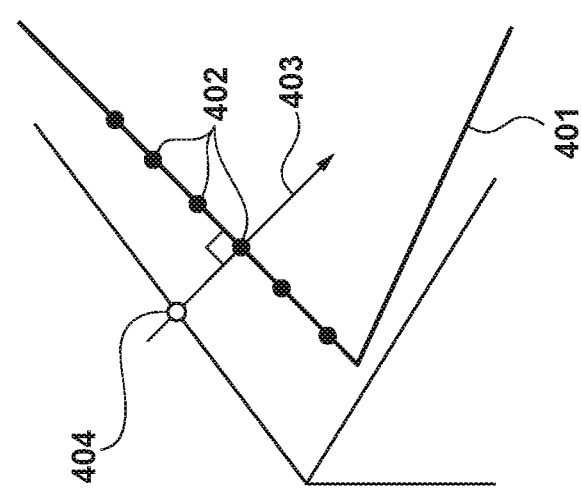

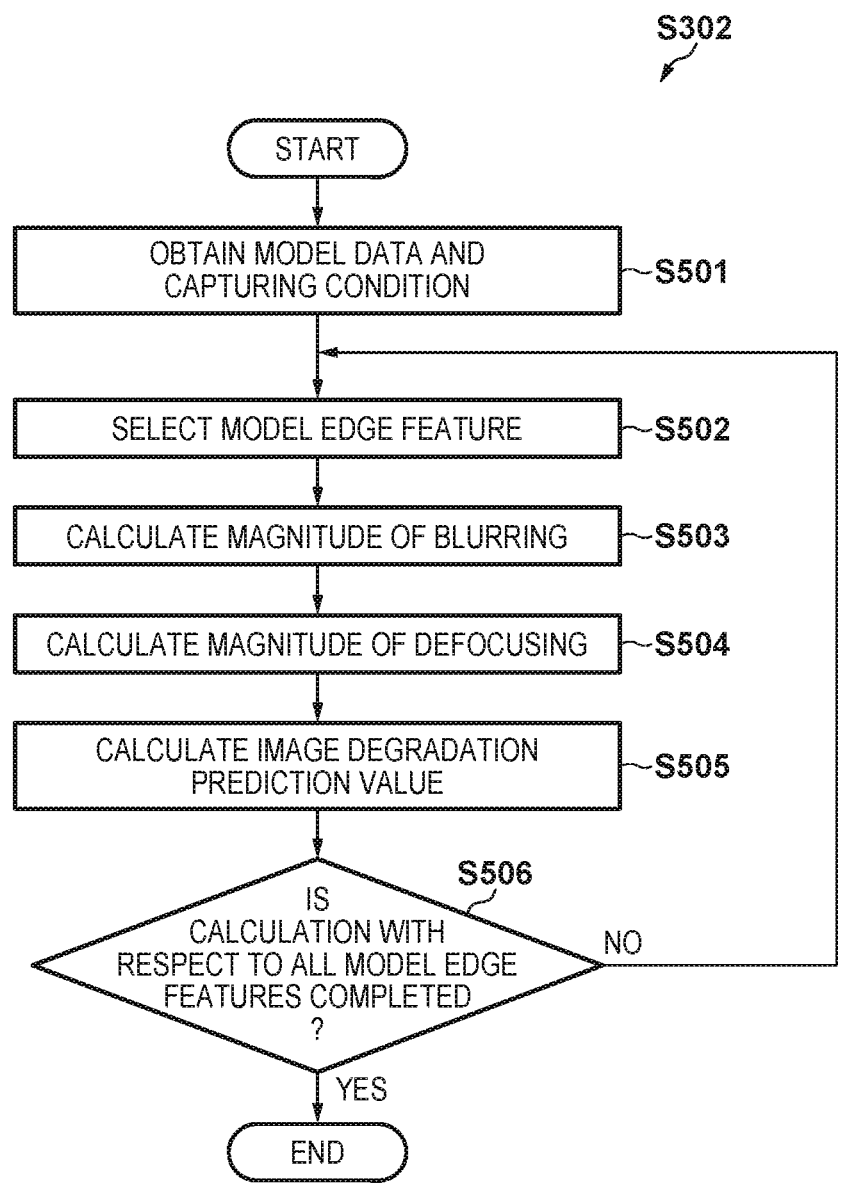

F I G. 11
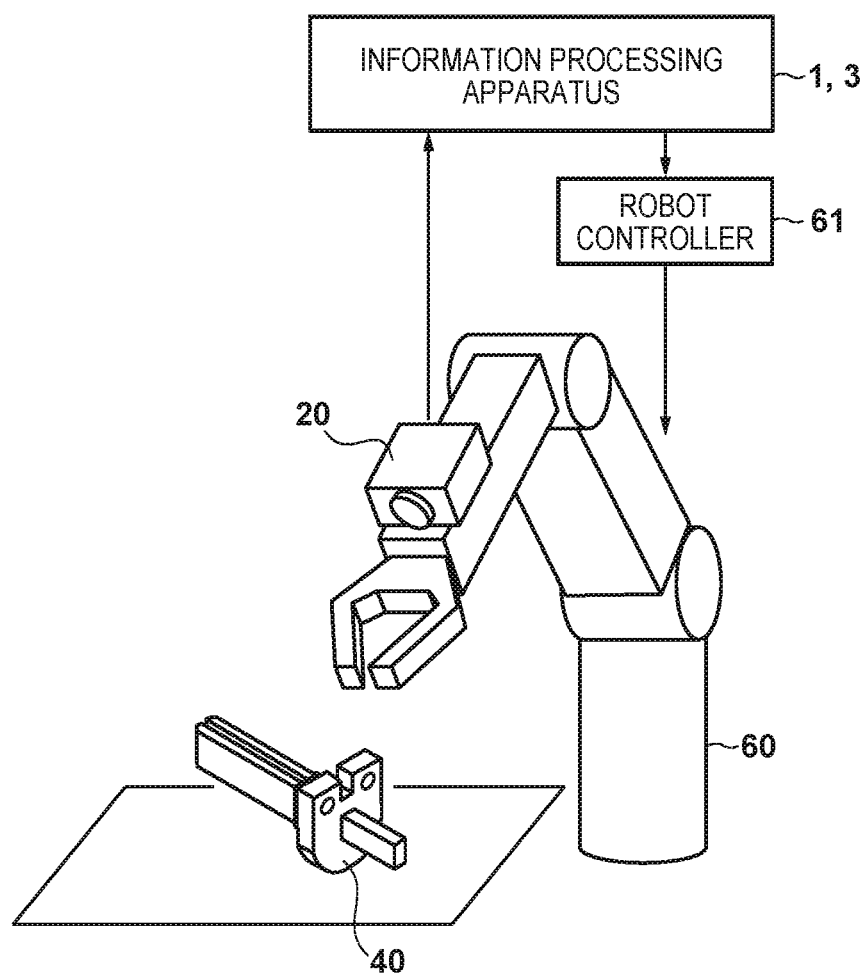

INFORMATION PROCESSING APPARATUS, CONTROL METHOD THEREOF, AND COMPUTER READABLE STORAGE MEDIUM THAT CALCULATE AN ACCURACY OF CORRESPONDENCE BETWEEN A MODEL FEATURE AND A MEASUREMENT DATA FEATURE AND COLLATE, BASED ON THE ACCURACY, A GEOMETRIC MODEL AND AN OBJECT IN AN IMAGE

CLAIM OF PRIORITY

This application claims the benefit of priority of Japanese Patent Application No. 2015-021488, filed Feb. 5, 2015, and No. 2015-242643, filed Dec. 11, 2015, which are hereby incorporated by reference herein in their entirety.

BACKGROUND OF THE INVENTION

Field of the Invention

The present invention relates to an information processing apparatus, a control method thereof, and a computer readable storage medium.

Description of the Related Art

With the development in robot technology in recent years, complicated tasks, such as assembling of industrial products that are conducted by humans, are being conducted by robots instead. Such robots conduct assembling by holding components with an end effector such as a hand. In order for the robot to hold a component, it is necessary to measure the relative positions and orientations of the component to be held and the robot (hand). Such measurement of the position and orientation of an object is applied not only for the robot to hold a component, but also, for various purposes, such as for self-location estimation for autonomous locomotion of the robot, and positional adjustment between a real space (real object) and a virtual object in augmented reality.

As a method of measuring the position and orientation of an object, a method is proposed that uses model features of a three-dimensional geometric model, and measurement data features on a two-dimensional image that is obtained by a capturing device such as a camera. T. Drummond and R. Cipolla, "Real-time visual tracking of complex structures," IEEE Transactions on Pattern Analysis and Machine Intelligence, vol. 24, no. 7, pp. 932-946, 2002 discloses a method of measuring the position and orientation of an object by applying a projected image of a three-dimensional geometric model of an object, which is represented by a set of line segments, to edges, which are measurement data features on a two-dimensional image. With this method, line segments of the three-dimensional geometric model are projected onto the two-dimensional image based on the approximate position and orientation that are given as known information, and edges that correspond to respective control points arranged discretely on the projected line segments are detected on the two-dimensional image. Based on the thus obtained correspondence between the control points (model features) and the edges (measurement data features), the approximate position and orientation are corrected so that the square sum of distances on the image between the projected image of the line segments to which the control points belong and the corresponding edges is the least, and thereby, the final position and orientation can be obtained.

SUMMARY OF THE INVENTION

However, according to the above-described method, in the event of mis-correspondence between the model features (control points) and the measurement data features (edges), there is the problem that, for example, processing for estimating the position and orientation of an object may fail, or the estimation accuracy of the position and orientation may deteriorate. In view of the above-described problems, according to an embodiment of the present invention, more accurate correspondence between model features of a geometric model and measurement data features on a two-dimensional image is realized.

According to one aspect, the present invention provides an information processing apparatus comprising a prediction unit configured to predict, based on a geometric model representing a shape of an object to be measured, an image degradation of the object to be measured in an image in which the object to be measured is captured by a capturing device, a searching unit configured to search a two-dimensional image in which the object to be measured is captured by the capturing device for a measurement data feature that corresponds to a model feature of the geometric model, an evaluation unit configured to evaluate, using the two-dimensional image, an image degradation with respect to the measurement data feature found by the searching unit, a calculation unit configured to calculate, based on the image degradation predicted by the prediction unit and the image degradation evaluated by the evaluation unit, an accuracy of the correspondence between the model feature and the measurement data feature, and a collation unit configured to collate, based on the accuracy of the correspondence between the model feature and the measurement data feature, the geometric model and the object to be measured in the two-dimensional image.

According to another aspect, the present invention provides an information processing apparatus comprising a prediction unit configured to predict, based on a geometric model representing a shape of an object to be measured, an image degradation of the object to be measured in an image in which the object to be measured is captured by a capturing device, an obtaining unit configured to obtain three-dimensional coordinates of a three-dimensional measurement point on a surface of the object to be measured, an evaluation unit configured to evaluate, based on the three-dimensional coordinates obtained by the obtaining unit, an image degradation at a position of a point group projected onto a two-dimensional image captured by the capturing device, a searching unit configured to search for a correspondence between the three-dimensional measurement point and a model feature of the geometric model, a calculation unit configured to calculate, based on the image degradation predicted by the prediction unit and the image degradation evaluated by the evaluation unit, an accuracy of the correspondence between the model feature and the three-dimensional measurement point, and a collation unit configured to collate, based on the accuracy of the correspondence between the model feature and the three-dimensional measurement point, the geometric model and three-dimensional measurement points representing the shape of the object to be measured.

According to another aspect, the present invention provides a control method of an information processing apparatus, the method comprising predicting, based on a geometric model representing a shape of an object to be measured, an image degradation of the object to be measured in an image in which the object to be measured is captured by a capturing device, searching a two-dimensional image in which the object to be measured is captured by the capturing device for a measurement data feature that corresponds to a model feature of the geometric model, evaluating, using the two-dimensional image, an image degradation with respect to the found measurement data feature, calculating, based on the predicted image degradation and the evaluated image degradation, an accuracy of the correspondence between the model feature and the measurement data feature, and collating, based on the accuracy of the correspondence between the model feature and the measurement data feature, the geometric model, and the object to be measured in the two-dimensional image.

Furthermore, according to another aspect, the present invention provides a control method of an information processing apparatus, the method comprising predicting, based on a geometric model representing a shape of an object to be measured, an image degradation of the object to be measured in an image in which the object to be measured is captured by a capturing device, obtaining three-dimensional coordinates of a three-dimensional measurement point on a surface of the object to be measured, evaluating, based on the obtained three-dimensional coordinates, an image degradation at a position of a point group projected onto a two-dimensional image captured by the capturing device, searching for a correspondence between the three-dimensional measurement point and a model feature of the geometric model, calculating, based on the predicted image degradation and the evaluated image degradation, an accuracy of the correspondence between the model feature and the three-dimensional measurement point, and collating, based on the accuracy of the correspondence between the model feature and the three-dimensional measurement point, the geometric model and three-dimensional measurement points representing the shape of the object to be measured.

Further features of the present invention will become apparent from the following description of exemplary embodiments with reference to the attached drawings.

BRIEF DESCRIPTION OF THE DRAWINGS

FIG. 3 is a flowchart illustrating a procedure of processing for measuring a position and orientation, according to the first embodiment.

FIGS. 4A and 4B are diagrams illustrating detection of edges from an image.

FIG. 5 is a flowchart illustrating a procedure for calculating an image degradation prediction value of the first embodiment.

FIG. 11 is a diagram illustrating an example of a configuration of a robot system according to a fourth embodiment.

DESCRIPTION OF THE EMBODIMENTS

Hereafter, preferred embodiments of the present invention will be described with reference to the accompanying drawings.

First Embodiment

In a first embodiment, edge features of the three-dimensional model (hereafter called a model edge feature) and measurement data features are associated with each other using the magnitudes of image blurring and defocusing obtained in a two-dimensional image. That is, the magnitudes of blurring and defocusing that will be obtained in the two-dimensional image are predicted for each model edge feature, the predicted magnitudes of blurring and defocusing are compared with the actually measured magnitudes of blurring and defocusing in the two-dimensional image, and association is performed with a high contribution for the features indicating values that are closer to each other. In the first embodiment, the magnitudes of blurring and defocusing are predicted by simulating and computing the magnitudes of blurring and defocusing, based on the shape represented by a geometric model that simulates an object to be measured, and a predetermined relative moving direction and speed between a capturing device and the object to be measured.

Figure 1A:
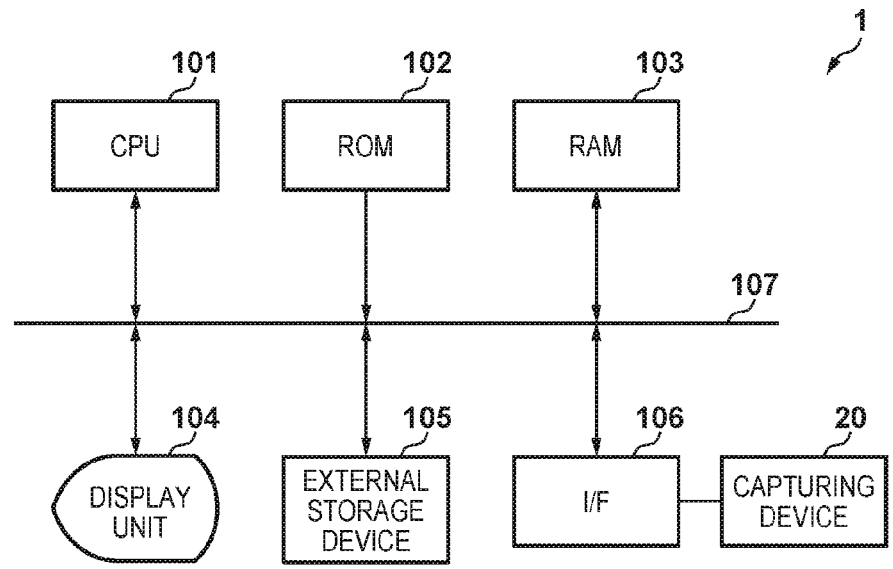
FIGS. 1A and 1B are diagrams illustrating configurations of an information processing apparatus according to a first embodiment.

FIG. 1A is a block diagram illustrating an example of a hardware configuration of an information processing apparatus 1 according to the present embodiment. In FIG. 1A, a CPU 101 realizes various types of control in the information processing apparatus 1 by executing programs stored in a ROM 102 or a RAM 103. The ROM 102 stores various types of data and various types of programs including a program that is executed at the time of startup of the CPU 101. The RAM 103 functions as a main memory for the CPU 101. For example, an application program read out from an external storage device 105 is expanded in the RAM 103 so as to be executed by the CPU 101. A display unit 104 performs various types of display under control of the CPU 101. The external storage device 105 is constituted by a hard disk, or the like, and stores the application program, data on a geometric model, and a two-dimensional image that is to be processed. An interface 106 communicates with an external device. The interface 106 is connected to a capturing device 20, for example, and receives a two-dimensional image from the capturing device 20. A bus 107 enables mutual communication between the above-described configurations.

Figure 1B:
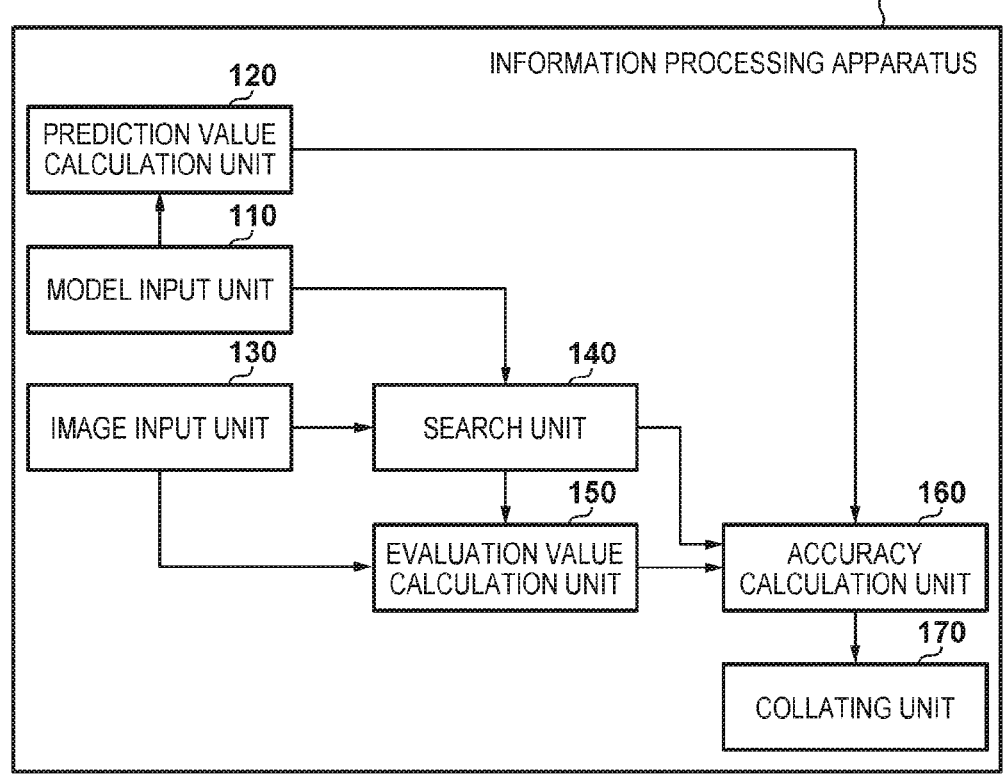

FIG. 1B is a block diagram illustrating an example of a functional configuration of the information processing apparatus 1 according to the present embodiment. The functions shown in FIG. 1B are realized by the CPU 101 executing the programs stored in the ROM 102, and/or, the programs expanded to the RAM 103 from the external storage device 105. Note that it is apparent that a part or all of the functional units may be realized by dedicated hardware. In FIG. 1B, the information processing apparatus 1 includes a model input unit 110, a prediction value calculation unit 120, an image input unit 130, a search unit 140, an evaluation value calculation unit 150, an accuracy calculation unit 160, and a collating unit 170. Furthermore, the configurations shown in FIGS. 1A and 1B are configurations serving as application examples of the information processing apparatus of the present invention. Hereafter, the functional units of the information processing apparatus 1 will be described.

Figure 2A:
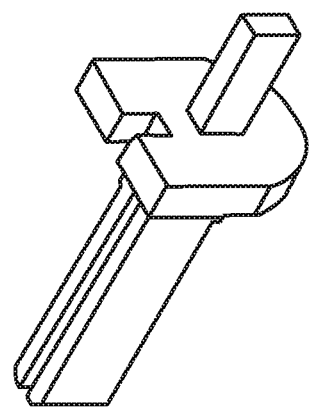
FIGS. 2A to 2C are diagrams illustrating examples of a three-dimensional geometric model of an object to be measured of the embodiment.

The model input unit 110 inputs a geometric model (in the present embodiment, a three-dimensional geometric model stored in the external storage device 105) that represents the shape of an object to be measured. The geometric model of the present embodiment is assumed to be a geometric model in which the shape of an object as shown in FIG. 2C is represented by information on local three-dimensional line segments on outlines of the object (model edge features) as shown in FIG. 2A, the information being constituted by three-dimensional positions and three-dimensional line segment directions. The geometric model is provided to the search unit 140 via the model input unit 110.

The prediction value calculation unit 120 calculates an image degradation prediction value of a two-dimensional image in which an object to be measured is captured. In the present embodiment, the image degradation prediction value is assumed to be a magnitude D of blurring due to being out of focus and a magnitude B of defocusing due to parallel translation on an image plane, and is calculated based on a three-dimensional geometric model of the object to be measured, an approximate position/orientation value, and internal parameters of the capturing device that has captured the two-dimensional image of the object to be processed. The processing for obtaining the magnitude D of blurring, the magnitude B of defocusing, and the image degradation prediction value will be described in detail later.

The image input unit 130 obtains a two-dimensional image in which the object to be measured is captured. The two-dimensional image that is obtained may be a grayscale image or a color image. In the present embodiment, the two-dimensional image is obtained from an external storage device (not shown) in which the two-dimensional image captured in advance is stored, but it is also possible that the image input unit 130 may directly obtain, from the capturing device 20, a two-dimensional image that is generated as a result of the capturing device 20 performing capturing. In any case, the two-dimensional image is held in association with internal parameters of the capturing device 20 that has captured this image.

The search unit 140 searches the two-dimensional image input from the image input unit 130 for candidates that correspond to model edge features in the geometric model of the object to be measured that was input from the model input unit 110. This search is conducted using approximate values of the position and orientation of all of the model edge features constituting the geometric model, and the internal parameters of the capturing device that has captured the two-dimensional image. In the present embodiment, edge features in the two-dimensional image (hereafter called an image edge feature) are detected as the correspondence candidates (measurement data features). "Image edge feature" refers to a point at which the density gradient that is detected by a differential filter has an extremal value.

FIGS. 4A and 4B are diagrams illustrating edge detection of the present embodiment. An image of each of line segments constituting the geometric model that are projected onto a two-dimensional image is calculated, based on the approximate position and orientation of the object to be measured, and the corrected internal parameters of the capturing device 20 that has captured the two-dimensional image.

As shown in FIG. 4A, the image of the projected line segment serves as a line segment (projected line segment 401) on the two-dimensional image as well. Then, control points 402 are set on the projected line segment 401 so as to have an equal distance therebetween on the two-dimensional image, and one-dimensional edge detection is performed in the normal line direction of the projected line segment 401 for each of the set control points 402 (FIG. 4A). That is, edge detection is performed along a search line 403 that extends in a normal line direction of the projected line segment 401 while passing through the control point 402 set on the projected line segment 401. Because an edge 404 of the two-dimensional image is detected as the extremal value in the density gradient of the pixel values, a plurality of edges may be detected for one control point if a plurality of edges are present in the vicinity, as shown in FIG. 4B. In the present embodiment, all of the detected edges are held as hypotheses.

The evaluation value calculation unit 150 estimates the magnitude of blurring and the magnitude of defocusing of the two-dimensional image obtained by the image input unit 130. In the present embodiment, an image degradation evaluation value is calculated for each image edge feature, by applying a function indicating a change in brightness of an edge of the two-dimensional image in the event of blurring/defocusing to a change in brightness of pixels in the direction orthogonal to the edge. The processing for detecting an edge in the two-dimensional image is the same as that of the edge detection by the search unit 140. The detailed processing will be described later.

The accuracy calculation unit 160 calculates the respective accuracies of the correspondences of the image edge features that are held by the search unit 140 as hypotheses of association with the model edge features of the geometric model of the object to be measured. The accuracy calculation is performed based on the image degradation prediction value obtained by the prediction value calculation unit 120 and the image degradation evaluation value obtained by the evaluation value calculation unit 150, and a detailed description thereof will be given later. The collating unit 170 calculates the position and orientation of the object to be measured, based on the image edge features on the two-dimensional image that correspond to the model edge features of the geometric model of the object to be measured, and the accuracies calculated by the accuracy calculation unit 160. The processing for calculating the position and orientation that is performed by the collating unit 170 will be described later in detail.

FIG. 3 is a flowchart illustrating a procedure of processing for associating image edge features with model edge features and calculating the position and orientation of an object to be measured on a two-dimensional image, according to the first embodiment. First, the model input unit 110 inputs a geometric model of the object to be measured, and the geometric model is loaded in the information processing apparatus 1 (step S301). Then, the prediction value calculation unit 120 calculates an image degradation prediction value of the two-dimensional image (step S302). The calculation of the image degradation prediction value is performed using approximate values of the position and orientation of all of the model edge features constituting the geometric model of the object to be measured, the relative moving direction and speed between the capturing device and the object to be measured, and internal parameters of the capturing device at the time of capturing the two-dimensional image. Note that, in the present embodiment, approximate values of the position and orientation at which the object is placed are used as the approximate values of the position and orientation of the model edge features. The processing for calculating an image degradation prediction value of the two-dimensional image will be described in detail later with reference to FIG. 5.

Then, the image input unit 130 inputs a two-dimensional image and the two-dimensional image is loaded in the information processing apparatus 1 (step S303). The search unit 140 searches the two-dimensional image input by the image input unit 130 for candidates that correspond to the model edge features of the geometric model (step S304). The method of searching for the correspondence candidates is as described above with reference to FIGS. 4A and 4B, and is performed based on the approximate values of the position and orientation of all the model edge features of the geometric model input by the model input unit 110, and the internal parameters of the capturing device at the time of capturing the two-dimensional image.

The evaluation value calculation unit 150 estimates the magnitudes of blurring and defocusing of the two-dimensional image obtained by the image input unit 130, and calculates an image degradation evaluation value (step S305). More specifically, the evaluation value calculation unit 150 performs edge detection on the two-dimensional image obtained by the image input unit 130. Then, the evaluation value calculation unit 150 applies a function indicating a change in brightness of the edge in the event of blurring/defocusing to a change in brightness of pixels in the direction orthogonal to the detected image edge feature, so as to thereby estimate the blurring/defocusing width of the edge part and to obtain the image degradation evaluation value. Details of the processing will be described later. Then, the accuracy calculation unit 160 calculates the accuracy of the correspondences between the model edge features and the image edge features that were obtained by the search unit 140, based on the image degradation prediction value obtained by the prediction value calculation unit 120 and the image degradation evaluation value obtained by the evaluation value calculation unit 150 (step S306). Details of the accuracy calculation processing will be described later with reference to FIG. 7. Then, the collating unit 170 calculates the position and orientation of the object to be measured, by applying the image edge features for which the highest accuracy was calculated to the model edge features of the geometric model (step S307).

FIG. 5 is a flowchart illustrating the processing for calculating image degradation prediction values in step S302. In the present embodiment, image degradation that is caused by image spread due to blurring and/or defocusing on the two-dimensional image of a model feature is predicted. Hereafter, the processing for calculating image degradation prediction values by the prediction value calculation unit 120 will be described with reference to the flowchart of FIG. 5. First, the prediction value calculation unit 120 obtains approximate values of the position and orientation of all of the model edge features of the geometric model, the relative moving direction and speed between the capturing device and the object to be measured, and internal parameters that were used in capturing the two-dimensional image (step S501). As the relative moving direction and speed between the capturing device and the object to be measured according to the present embodiment, for example, the moving amount and moving direction of translational movement in one axial direction are obtained based on design data for a case when the object to be measured is placed on equipment (for example, a belt conveyer) that performs that translational movement.

Then, the prediction value calculation unit 120 selects one of the model edge features from the geometric model, in order to calculate an image degradation prediction value GO (step S502). Also, the prediction value calculation unit 120 calculates the magnitude D of blurring that is predicted at the selected one of the model edge features using Formula 1 below (step S503).

$$D = \frac{f^2(L_o - L_n)}{FL_n(L_o - f)\Delta d} \quad \text{[Formula 1]}$$

In the above-described Formula 1, "f" refers to the focal length of the capturing lens, "$L_o$" refers to the focus point of a virtual view point, "$L_n$" refers to the distance from the virtual view point to the model point, "F" refers to the f-number of the lens, and "$\Delta d$" refers to the size of the pixel. The focal length "f" and the f-number "F" of the capturing lens are obtained by referencing the specifications of the capturing device used. "$L_n$" is calculated based on the approximate position and orientation that were input in step S501. The internal parameters such as the focal length, the principle point, and a lens distortion parameter of the camera lens that is used for capturing the image are obtained by referencing the specifications of the device used, or by performing calibration in advance using the method disclosed in R. Y. Tsai, "A versatile camera calibration technique for high-accuracy 3D machine vision metrology using off-the-shelf TV cameras and lenses," IEEE Journal of Robotics and Automation, vol. RA-3, no. 4, 1987.

Then, the prediction value calculation unit 120 calculates the magnitude of defocusing that is predicted at the same model edge feature at which the magnitude of blurring was predicted in step S503 (step S504). In the present embodiment, the moving amount of each model edge feature on the two-dimensional image during an exposure time is used as the defocusing amount. Specifically, a moving amount on an image surface during an exposure time of a feature of projected local edge is used, the moving amount being detected from an image obtained by projecting the geometric model onto the two-dimensional image. In step S504, the Jacobian of the feature of projected local edge obtained on the image onto which the model is projected is calculated, and the magnitude of defocusing of the feature of projected local edge is calculated based on the Jacobian of the feature of projected local edge, and the relative moving direction/speed between the capturing device and the object to be measured that was input in step S501.

The Jacobian of the feature of the projected local edge refers to a value that represents the ratio of a change in the feature of the projected local edge on an image, when the six degrees of freedom parameters of position and orientation are slightly changed. Assume that a defocus amount of the image edge feature that corresponds to the feature of projected local edge is represented by (du, dv), and the normal line direction of the feature of projected local edge is represented by (nu, nv) (unit vector) based on the approximate position/orientation s of the object to be measured, a signed inter-correspondence distance $err_{2D}$ can be calculated by Formula 2. Note that it is assumed that du=u'−u, and dv=v'−v are applied.

$$err_{2D} = n_u(u'-u) + n_v(v'-v) \quad \text{[Formula 2]}$$

Here, the position/orientation s of the object to be measured is a six-dimensional vector, and is constituted by three elements ($s_1$, $s_2$, $s_3$) representing the position of the target object, and three elements ($s_4$, $s_5$, $s_6$) representing the orientation thereof. The three elements representing the orientation are expressed by Euler angles, or a three-dimensional vector in which the direction indicates the axis of rotation that passes through the origin and the norm indicates the angle of rotation, for example. By performing partial differentiation on the inter-correspondence distance $err_{2D}$ using the parameters of this position/orientation s, the Jacobian of the feature of projected local edge is calculated by Formula 3 below.

$$J_{2D} = \left[ \frac{\partial err_{2D}}{\partial s_1} \quad \frac{\partial err_{2D}}{\partial s_2} \quad \frac{\partial err_{2D}}{\partial s_3} \quad \frac{\partial err_{2D}}{\partial s_4} \quad \frac{\partial err_{2D}}{\partial s_5} \quad \frac{\partial err_{2D}}{\partial s_6} \right] \quad \text{[Formula 3]}$$

As described above, the Jacobian of the feature of the projected local edge selected in step S502 is calculated. A distance change B between the model edge feature and the image edge feature in the two-dimensional image can be calculated by Formula 4 using this Jacobian of the feature of projected local edge, the distance change B occurring due to the target object moving at a speed V with the relative position/orientation during an exposure time $t_i$ of the two-dimensional image.

$$B = t_i J_{2D} V \quad \text{[Formula 4]}$$

B is a scalar and represents the amount of movement of the two-dimensional position of the feature of the projected local edge on an image plane during the exposure time. The above-described processing is performed on all of the model edge features, and the defocus amounts with respect to all of the model edge features are calculated.

Then, the prediction value calculation unit 120 calculates the image degradation prediction value $\sigma 0$ of the model edge feature selected in step S502, based on the magnitude D of blurring calculated in step S503 and the magnitude B of defocusing calculated in step S504, using Formula 5 (step S505).

$$\sigma_0 = \sqrt{D^2 + B^2} \quad \text{[Formula 5]}$$

The processing in steps S502 to S505 is repeated until the calculation of the image degradation prediction value $\sigma_0$ is completed with respect to all of the model edge features (step S506). Accordingly, the present procedure ends upon completion of the calculation of the image degradation prediction value $\sigma_0$ with respect to all of the model edge features.

Next, the processing for evaluating the magnitudes of blurring/defocusing from the two-dimensional image in step S305 will be described. In the present embodiment, image degradation that was caused by the image spread due to blurring and/or defocusing on the two-dimensional image of measurement data features is evaluated.

Figure 6:
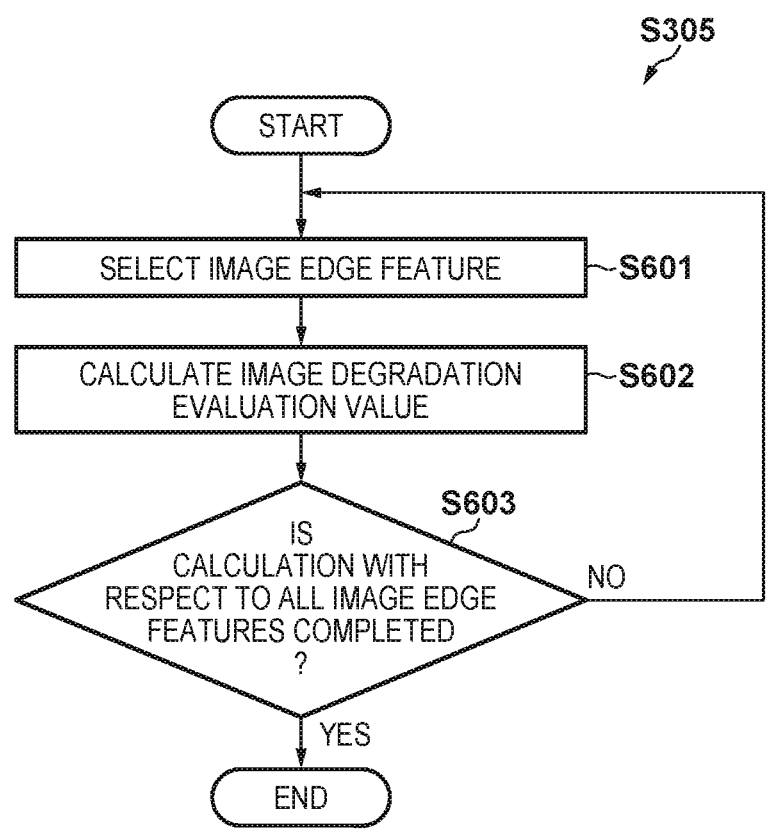
FIG. 6 is a flowchart illustrating a procedure for calculating an image degradation evaluation value of a two-dimensional image of the first embodiment.

FIG. 6 is a flowchart illustrating the processing for calculating image degradation evaluation values that is performed by the evaluation value calculation unit 150 in step S305. The evaluation value calculation unit 150 selects one of the image edge features that are the correspondence candidates detected in step S304 (step S601), and calculates the image degradation evaluation value of the selected image edge feature (step S602).

The calculation of the image degradation evaluation values that is performed by the evaluation value calculation unit 150 will be described. Based on the position of the image edge feature selected in step S601 and the normal line direction of the edge, the evaluation value calculation unit 150 calculates the magnitudes of blurring/defocusing of the image edge feature. As an edge model for use in the present embodiment, an error function erf as expressed by Formula 6 below is used for application so as to obtain σ as the magnitudes of blurring/defocusing.

$$\text{erf}(r, \theta, \sigma) = \frac{2}{\sqrt{\pi}} \int_{-t}^{t} \exp\left(-\frac{(r\cos\theta - x_0)^2 + (r\sin\theta - y_0)^2}{\sigma^2}\right) dr \quad \text{[Formula 6]}$$

In Formula 6, $x_0$, $y_0$ are positions of a pixel of interest at which an edge is present, r is the distance from the pixel of interest position, θ is a normal line direction of the edge, t is a search range from the pixel of interest, and σ is a value obtained by integrating the magnitude of blurring and the magnitude of defocusing (image degradation evaluation value). Note that t is an arbitrary positive value.

The image degradation evaluation value σ is estimated by minimizing an evaluation function E expressed by Formula 7 below using, for example, a repeat operation using a steepest descent method or the Levenberg-Marquardt method.

$$E = \sum_y \sum_x \{I(x, y) - \text{erf}(r, \theta, \sigma)\}^2 \quad \text{[Formula 7]}$$

In Formula 7, I(x, y) is a brightness value of a captured image at coordinates (x, y).

The processing of steps S601 and S602 is repeated until the evaluation of the magnitudes of blurring/defocusing is completed with respect to all of the image edge features detected in step S304 (step S603). The present procedure ends upon completion of the evaluation of the magnitudes of blurring/defocusing with respect to all of the image edge features detected in step S304.

Figure 7:
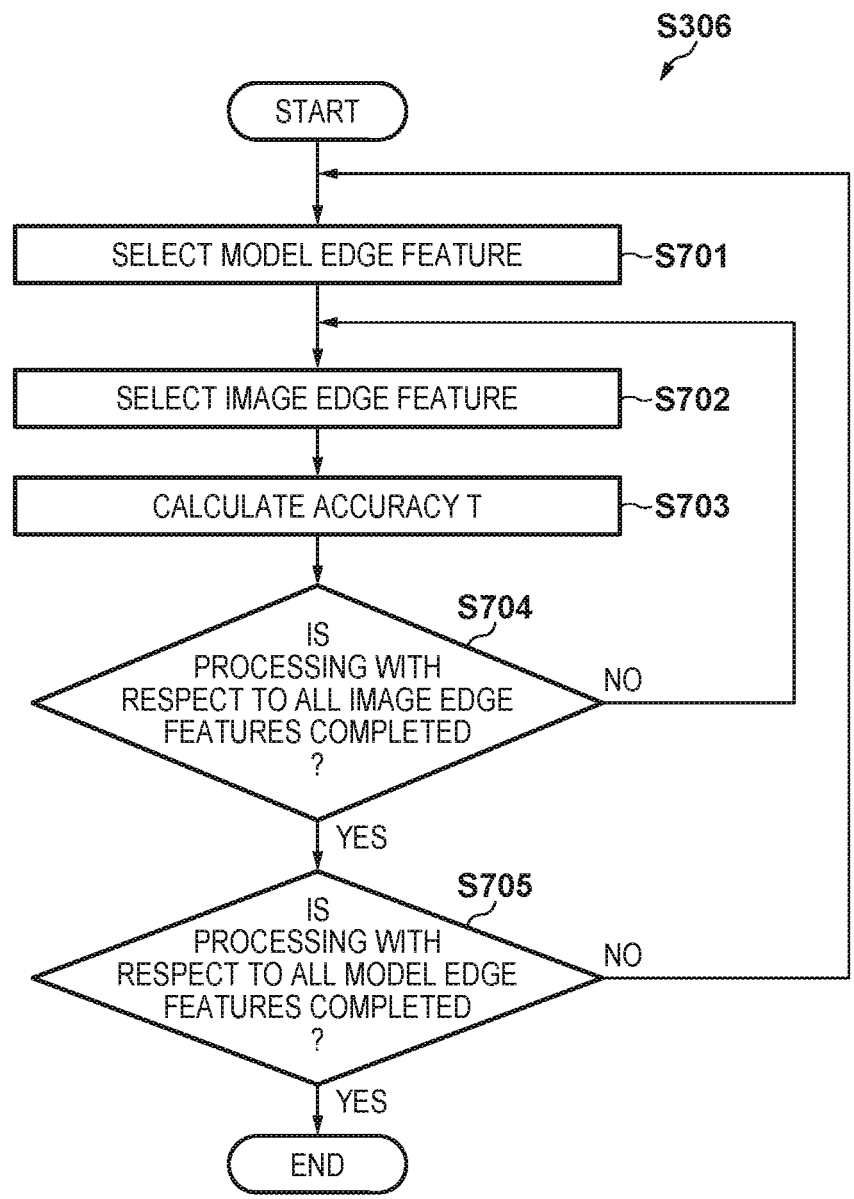
FIG. 7 is a flowchart illustrating the procedure of processing for calculating a correspondence weight of the first embodiment.

FIG. 7 is a flowchart illustrating the processing for calculating the accuracies in step S306. In the present embodiment, a higher accuracy is calculated when the image degradation prediction value, which is the degree of image degradation calculated by the prediction value calculation unit 120, and the image degradation evaluation value, which is the degree of image degradation evaluated by the evaluation value calculation unit 150, are closer to each other. First, the accuracy calculation unit 160 selects one of the model edge features in the geometric model of the object to be measured (step S701). Then, the accuracy calculation unit 160 selects one of the image edge features (correspondence candidate) found by the search unit 140 in step S304, as a candidate to be associated with the model edge feature selected in step S701, (step S702), and the accuracy thereof is calculated (step S703). Hereafter, the accuracy calculation will be described.

The accuracy calculation unit 160 obtains the image degradation evaluation value σ that corresponds to the image edge feature selected in step S702 with reference to the calculation result of the evaluation value calculation unit 150. Furthermore, the accuracy calculation unit 160 obtains the image degradation prediction value $\sigma_0$ of the model edge feature selected in step S701. The accuracy calculation unit 160 calculates the accuracy T between the image degradation prediction value $\sigma_0$ and the image degradation evaluation value $\sigma$, according to Formula 8.

$$T = 1/|\sigma_0^2 - \sigma^2| \qquad \text{[Formula 8]}$$

The processing in steps S702 to S703 is repeated until the calculation of the accuracy T is completed with respect to all of the correspondence candidates (image edge features) for which the search unit 140 has searched, with respect to the model edge feature selected in step S701. Upon completion of the calculation of the accuracy T with respect to all of the correspondence candidates (image edge features), the procedure advances to step S705. The accuracy calculation unit 160 repeats the above-described processing (steps S701 to S704) until the processing is completed with respect to all of the model edge features in the geometric model of the object to be measured. The present procedure ends upon completion of the processing with respect to all of the model edge features.

Figure 8:
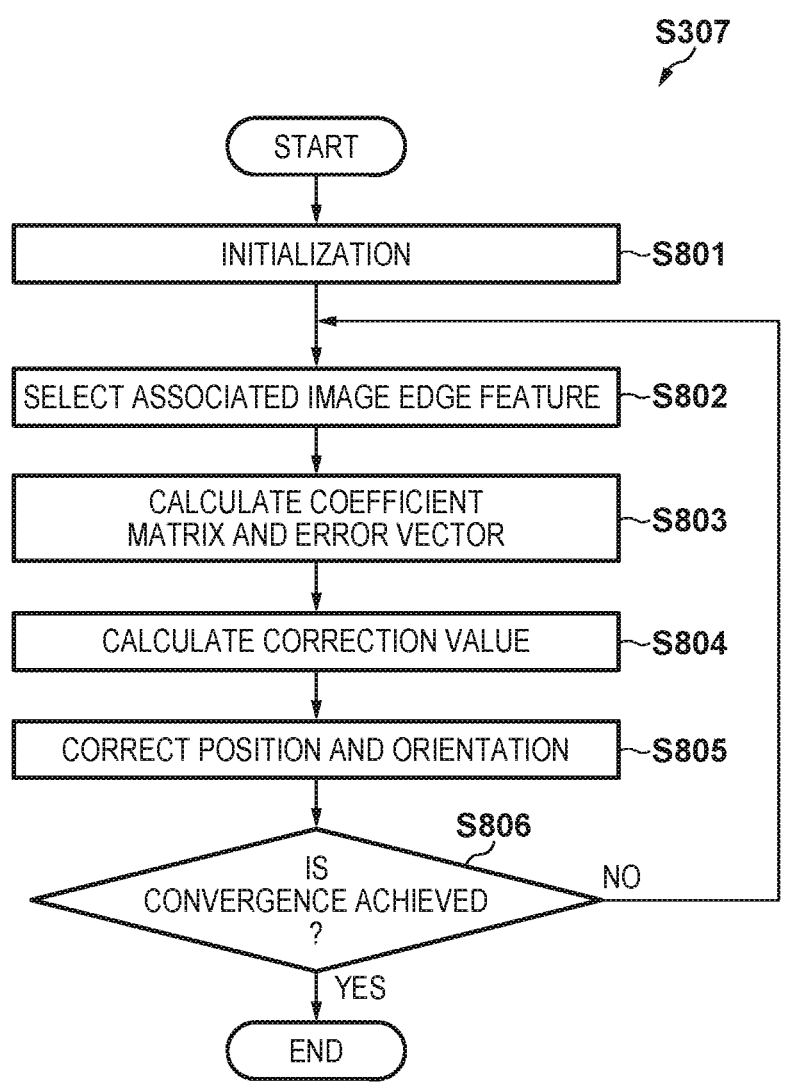
FIG. 8 is a flowchart illustrating the procedure of processing for calculating a position and orientation of the first embodiment.

FIG. 8 is a flowchart illustrating the procedure of processing of position/orientation calculation by the collating unit 170 in step S307. The collating unit 170 repeatedly corrects approximate values of the position and orientation (hereafter, represented by "six-dimensional vector s") of the object to be measured by an iterative operation using the Gauss-Newton method, which is one of nonlinear optimization methods, so that the geometric model is applied to the measurement data.

First, the collating unit 170 performs initialization processing (step S801). In the present embodiment, the approximate values of the position and orientation of the object to be measured are input, as the approximate values, to the collating unit 170. These approximate values are the same as those used in step S302. Then, the collating unit 170 selects the image edge feature that is to be collated with the model edge feature of the model (step S802). For selection, the accuracy T of the correspondence between the image edge feature and the model edge feature that is calculated by the accuracy calculation unit 160 is used. For example, when a plurality of image edge features are detected as hypotheses of association with one model edge feature, the correspondence candidate (image edge feature) that has the highest accuracy T is associated with the model edge feature, and the following processing is performed.

Then, the collating unit 170 calculates a coefficient matrix and an error vector for use in calculation of the position and orientation (step S803). Here, elements of the coefficient matrix are one-dimensional partial differential coefficients relating to the elements of the position and orientation assuming that the distance between a point and a straight line on an image is a function of the position and orientation. The error vector for an edge is a signed distance on an image between a projected line segment and the detected edge, and the error vector for point group data is a signed distance in a three-dimensional space of points and surfaces of a model.

Figure 9:
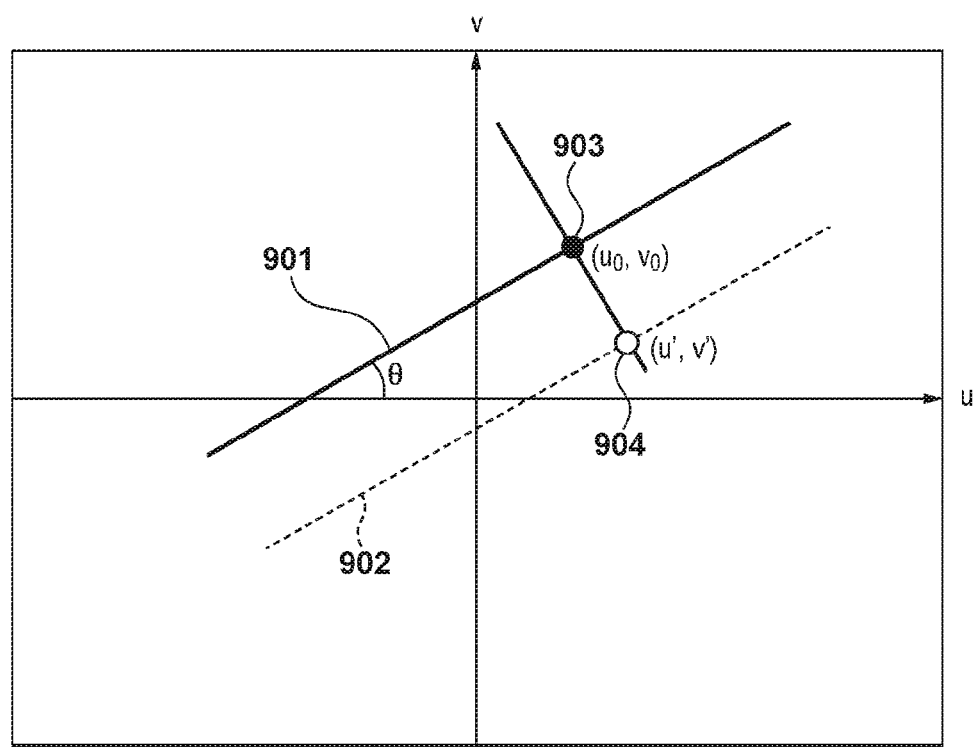
FIG. 9 is a diagram illustrating the relationship between a projected image of a line segment and a detected edge.

Hereafter, derivation of the coefficient matrix will be described. FIG. 9 is a diagram illustrating the relationship between a line segment 901, which is a projected image, and a detected edge 902. In FIG. 9, the horizontal and vertical directions of the image are respectively shown as a u-axis and a v-axis. The position of a control point 903 (points on the image that are separated at an equal distance from one another on each projected line segment) on the image is represented as $(u_0, v_0)$, and the inclination on the image of the line segment 901 to which this control point 903 belongs is represented by an inclination $\theta$ with respect to the u-axis. The inclination $\theta$ is calculated as an inclination of a straight line obtained by projecting three-dimensional coordinates at both ends of the line segment onto the image based on the position/orientation s of the object to be measured and connecting the coordinates at both ends on the image. A normal vector of the line segment 901 on the image is represented as $(\sin \theta, -\cos \theta)$. Furthermore, the coordinates of a corresponding point 904 that corresponds to the control point 903 on the two-dimensional image are assumed to be $(u', v')$. Here, a point $(u, v)$ on a straight line (edge 902 denoted by the dotted line of FIG. 9) that passes through the point $(u', v')$ and has the inclination of $\theta$ ($\theta$ is a constant) is represented as Formula 9 below. Here, $d = u' \sin \theta - v' \cos \theta$ (constant) is applied.

$$u \sin \theta - v \cos \theta = d \qquad \text{[Formula 9]}$$

The position of the control point on the image changes depending on the position and orientation of the object to be measured. Furthermore, the degree of freedom of the position and orientation of the object to be measured is six degrees of freedom. That is, the position/orientation s is a six-dimensional vector, and is constituted by three elements representing the position of the measurement target object, and three elements representing the orientation thereof. The three elements representing the orientation are expressed by Euler angles, or a three-dimensional vector in which the direction indicates the axis of rotation that passes through the origin and the norm indicates the angle of rotation, for example. The coordinates $(u, v)$ of the control point on the image that changes depending on the position and orientation can be approximated as Formula 10 below by one-dimensional Taylor expansion in the vicinity of $(u_0, v_0)$. Note that, in Formula 10, $\Delta_{si}$ ($i = 1, 2, \ldots, 6$) represents a small variation in each element of "s".

$$u \approx u_0 + \sum_{i=1}^{6} \frac{\partial u}{\partial s_i} \Delta s_i \qquad \text{[Formula 10]}$$

$$v \approx v_0 + \sum_{i=1}^{6} \frac{\partial v}{\partial s_i} \Delta s_i$$

If the approximate values of the position and orientation hardly differ from the actual position and orientation, it is possible to assume that the position of the control point on the image that can be obtained by the correct "s" is present on the straight line expressed by Formula 9. Formula 11 can be obtained by substituting u, v that are approximated by Formula 10 into Formula 9.

$$\sin \theta \sum_{i=1}^{6} \frac{\partial u}{\partial s_i} \Delta s_i - \cos \theta \sum_{i=1}^{6} \frac{\partial v}{\partial s_i} \Delta s_i = d - r \qquad \text{[Formula 11]}$$

Note that $$r = u_0 \sin \theta - v_0 \cos \theta \text{ (constant)}$$

Error on the image is converted into error in the three-dimensional space by multiplying the depth of each control point (the distance for a view point to the control point=z) calculated based on the approximate values of the position and orientation by the error on the image.

A simultaneous equation to be solved is as Formula 12.

$$\begin{bmatrix} z_1\left(\sin\theta_1 \frac{\partial u}{\partial s_1} - \cos\theta_1 \frac{\partial v}{\partial s_1}\right) & z_1\left(\sin\theta_1 \frac{\partial u}{\partial s_2} - \cos\theta_1 \frac{\partial v}{\partial s_2}\right) & \ldots & z_1\left(\sin\theta_1 \frac{\partial u}{\partial s_6} - \cos\theta_1 \frac{\partial v}{\partial s_6}\right) \\ z_2\left(\sin\theta_2 \frac{\partial u}{\partial s_1} - \cos\theta_1 \frac{\partial v}{\partial s_1}\right) & z_2\left(\sin\theta_2 \frac{\partial u}{\partial s_2} - \cos\theta_1 \frac{\partial v}{\partial s_2}\right) & \ldots & z_2\left(\sin\theta_2 \frac{\partial u}{\partial s_6} - \cos\theta_2 \frac{\partial v}{\partial s_6}\right) \\ \vdots & \vdots & \vdots & \vdots \end{bmatrix}$$ [Formula 12]

$$\begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} z_1(d_1 - r_1) \\ z_2(d_2 - r_2) \\ \vdots \end{bmatrix}$$

In Formula 12, $z_1$, $z_2$ . . . indicate depths of the edges. Here, Formula 12 is expressed as Formula 13. In Formula 13, J is a coefficient matrix, E is an error vector, and $\Delta s$ is a correction value.

$$J\Delta s = E$$ [Formula 13]

A partial differential coefficient for use in calculating the coefficient matrix J of the linear simultaneous equation can be calculated by a method disclosed in, for example, Document 2.

Then, the collating unit 170 obtains a correction value $\Delta s$ for the position and orientation as a least squares criterion using a generalized inverse $(J^T \cdot J)-1 \cdot J^T$ of the matrix J based on Formula 13 (step S804). However, a robust estimation method as will be described below is used because edges and point group data are outliers due to false detection, or the like. Ordinarily, the edges and the point group data that are outliers have a large value of the error vector of the right side of Formula 12. Accordingly, a small weight is given to data having a large absolute value of the error, and a large weight is given to data having a small absolute value of the error. The weight is given by a Tukey function as given in, for example, Formula 14.

$$w(z(d-r)) = \begin{cases} (1 - (z(d-r)/c_1)^2)^2 & |z(d-r)| \le c_1 \\ 0 & |z(d-r)| > c_1 \end{cases}$$ [Formula 14]

$$w(e-q) = \begin{cases} (1 - ((e-q)/c_2)^2)^2 & |e-q| \le c_2 \\ 0 & |e-q| > c_2 \end{cases}$$

In Formula 14, $c_1$ and $c_2$ are constants. Note that the weighting function does not need to be a Tukey function, and any function such as a Huber function may be used as long as it is a function that gives a small weight to data having a large error, and gives a large weight to data having a small error.

The weight that corresponds to each item of measurement data (edges or point group data) is assumed to be $w_i$. Here, a weight matrix W is defined as in Formula 15.

$$W = \begin{bmatrix} w_1 & & & 0 \\ & w_2 & & \\ & & \ddots & \\ 0 & & & w_{N_c} \end{bmatrix}$$ [Formula 15]

The elements of the weight matrix W other than diagonal elements are square matrices of zero, and the diagonal elements are the weight $w_i$ calculated according to Formula 14. Formula 13 is deformed to Formula 16 using this weight matrix W.

$$WJ\Delta s = WE$$ [Formula 16]

A correction value $\Delta s$ is obtained by solving Formula 16 as shown in Formula 17.

$$\Delta s = (J^T W J)^{-1} J^T W E$$ [Formula 17]

Returning to FIG. 8, the collating unit 170 corrects the approximate value of the position and orientation based on the correction value $\Delta s$ for the position and orientation that are calculated in step S804 (step S805).

$$s \leftarrow s + \Delta s$$ [Formula 18]

Then, the collating unit 170 conducts a convergence test, and ends the test if convergence has been achieved, or returns the procedure to step S802 if convergence has not been achieved (step S806). In the convergence test, it is determined that convergence has been achieved when the correction value $\Delta s$ is substantially 0, or when the square sum of error vectors hardly changes between before and after the correction (the difference between before and after the correction is less than a predetermined threshold). Note that the description above cited an example in which the Gauss-Newton method is used as a nonlinear optimization method. However, the nonlinear optimization method is not limited to this, and other nonlinear optimization methods such as the Newton-Raphson method, the Levenberg-Marquardt method, the steepest descent method, or the conjugate gradient method may be used.

The shape information that is held as a model of an object to be measured in the present embodiment only needs to be two-dimensional or three-dimensional geometric information on a target shape, and the expression format is not particularly limited. For example, two-dimensional geometric information may be expressed by a set of simple two-dimensional points, or a set of two-dimensional lines. Furthermore, three-dimensional geometric information may be expressed by a set of simple three-dimensional points, a set of three-dimensional lines representing edge lines, shape information in polygonal representation represented by a set of lines constituted by three three-dimensional points, or the like.

Furthermore, an example has been described in which information on the moving direction and the moving amount assuming that the object to be measured performs translational movement in a direction is input as the relative moving direction/speed between the capturing device and the object to be measured that is input in step S501, but the present embodiment is not limited to this. For example, a sensor may be attached to the object to be measured, and a speed with the relative position/orientation between the capturing device and the object to be measured may be calculated based on the information from the sensor. Furthermore, in a case when the capturing device moves, the movement of the capturing device may be obtained. For example, in a case when the capturing device is attached to a robot, robot motion information may be used as an input of the relative moving direction/speed between the capturing device and the object to be measured. Alternatively, a physical sensor, such as a magnetic sensor or an ultrasonic sensor that measures the position and orientation of six degrees of freedom may be attached to the capturing device, and these items of information may be input. In the present embodiment, any method may be used as long as it can calculate the speed with the relative position/orientation between the capturing device and the object to be measured, and the selection of means or a device is not particularly limited.

Furthermore, the amount that is estimated as an image degradation prediction value in the prediction value calculation unit 120 is not limited to the above-described information. For example, any amount may be used as long as it can represent an amount of degradation of a two-dimensional image due to the relative movement between the capturing device and the object to be measured, and the calculation method and expression are not particularly limited. For example, the magnitude of defocusing of an image edge feature of a two-dimensional image in which an object to be measured is captured may be expressed as a moving amount in a three-dimensional space that is calculated by back-projection onto the three-dimensional space. Furthermore, a point spread function (PSF) that is generated based on the magnitude D of blurring and the magnitude B of defocusing may be used as the image degradation evaluation value. Also, in the above-described embodiment, a prediction value is obtained taking into consideration an effect of both blurring and defocusing, but a prediction value may be obtained that takes into consideration an effect of only one of them.

Furthermore, in the present embodiment, an edge feature is used as the measurement data feature that serves as a correspondence candidate in the search unit 140, but the present embodiment is not limited to this. For example, any feature such as a point feature may be used as long as it can specify the position on a two-dimensional image. Furthermore, instead of only one specific type of feature being used, correspondence between a plurality of types of features (for example, a point and an edge) and a model feature may be detected.

Furthermore, the method of the evaluation value calculation unit 150 to estimate the magnitudes of blurring/defocusing based on the single image is not limited to the above-described method. For example, blurring/defocusing is assumed to spread in a manner of Gaussian distribution, and the magnitude of blurring/defocusing may be obtained based on a standard deviation obtained by fitting the brightness distribution of the edges at which blurring/defocusing is occurring to a Gaussian function using a least-square method. Furthermore, in the present embodiment, the image degradation evaluation value is calculated in a unit of an edge feature, but the present embodiment is not limited to this. For example, a two-dimensional image may be divided into square partial regions, and an image degradation evaluation value may be calculated for each partial region.

Furthermore, the accuracy is calculated using Formula 8 in the accuracy calculation unit 160, but the accuracy calculation method is not limited to this. The accuracy calculation function may be any function that can calculate a small accuracy when the difference between the image degradation evaluation value and the image degradation prediction value is large, and can calculate a large accuracy when the difference between the image degradation evaluation value and the image degradation prediction value is small. For example, a Gaussian function, a Tukey function, a Huber function, or the like, may be used.

Furthermore, a pair of a model edge feature and an image edge feature with a highest accuracy is collated in the collating unit 170, but the present embodiment is not limited to this. It is sufficient that a pair for which a high accuracy is calculated is selected with priority, and it is also possible that if, for example, a pair having the highest accuracy is selected, but the accuracy is less than a predetermined threshold, the pair will not be used for the collation. Similarly, it is also possible that if only one pair of a model edge feature and an image edge feature is detected, and it has an accuracy less than the predetermined threshold, the pair will not be used for the collation. Furthermore, in the present embodiment, the collating unit 170 obtains the position and orientation of the object to be measured, but the present embodiment is not limited to this. For example, the positions of model edge features on a two-dimensional image at a plurality of positions and orientations are held, and the model edge features and the image edge features may be collated using pattern matching, and the approximate position and orientation may be identified, or the type of the object may be specified.

Furthermore, in steps S302, S501, and S801, approximate values of the position and orientation at which an object to be measured is placed are given as approximate values of the position and orientation of a model of the object. However, the method of inputting the approximate position and orientation is not limited to this. For example, the measurement values obtained in the last (previous time) measurement may be used as the approximate position and orientation. Furthermore, the speed or the angular velocity of the object may be estimated using a time-series filter based on the past measurement of the position and orientation, and the current position and orientation may be predicted based on the speed and the angular velocity estimated based on the past position and orientation, and may be used as the approximate position and orientation. Furthermore, if it is possible to measure the position and orientation of an object using another sensor, output values of this sensor may be used as the approximate values of the position and orientation. Examples of the sensor include a magnetic sensor that emits a magnetic field using a transmitter and detects the emitted magnetic field using a receiver mounted on the object, thereby measuring the position and orientation, and an optical sensor that captures a marker arranged on the object using a camera fixed in the scene, thereby measuring the position and orientation. Also, any sensor may be used as long as it is a sensor that measures the position and orientation with six degrees of freedom. Furthermore, when the approximate position and orientation at which the object is placed are known in advance, these values may be used as the approximate values.

As described above, the first embodiment has described a method in which the accuracy of a correspondence is calculated based on the magnitudes of image blurring and defocusing on a two-dimensional image in which an object to be measured is captured, and a model feature and a measurement data feature are collated with each other. Accordingly, it is possible to achieve correct collation between the model feature and the measurement data feature.

Modification 1

In the first embodiment, the collating unit 170 selects a pair of a model edge feature and an image edge feature that has a high accuracy, and subjects the selected pair to collation, but the present embodiment is not limited to this.

It is sufficient that a pair for which a high accuracy is calculated is used with priority for the collation processing, and for example, the degree of the accuracy of each correspondence between a model edge feature and an image edge feature may be set as a weight for the image edge feature when the position and orientation are estimated, and collation may be performed based on this weighting. This weighting method will be described. First, the accuracy T of each correspondence between a model edge feature and an image edge feature is given to a diagonal element of the weight matrix W calculated by Formula 15. The correction value Δs for the position and orientation is obtained by performing calculation as in Formula 17 using this weight matrix W, and the approximate values of the position and orientation are corrected. By the above-described method, it is possible to perform collation with a priority on a pair for which a high accuracy is calculated.

Note that the accuracy T itself is given as a value that is to be given to the diagonal element of the weight matrix W, but the value is not limited to this. Any value may be used as long as it is a value that gives a large weight to a pair having a high accuracy and gives a small weight to a pair having a low accuracy, and the ratio obtained by dividing all of the accuracies by the maximum accuracy may be given as a weight.

As described above, Modification 1 has described a method in which the degree of accuracy of a correspondence, based on the magnitudes of image blurring and defocusing on a two-dimensional image in which an object to be measured is captured, is set as a weight for each feature of data, and collation between a model edge feature and an image edge feature is performed. Accordingly, it is possible to achieve highly accurate collation.

Second Embodiment

The first embodiment has described a method in which the magnitudes of blurring and defocusing that are to occur on a two-dimensional image are predicted from a model, and the predicted magnitudes are compared with the magnitudes of image blurring and defocusing that are obtained from a two-dimensional image so that the accuracy is calculated, and this accuracy is used for association with a model edge feature. In a second embodiment, an image degradation prediction value of each model edge feature is calculated based on the two-dimensional image on which the magnitude of blurring and defocusing have been calculated in advance, and the calculated image degradation prediction value is compared with the actually measured magnitudes of image blurring and defocusing so that the accuracies of correspondences are calculated, and the features having the highest accuracy are associated with each other. Hereafter, the second embodiment will be described. The configurations of the information processing apparatus and the procedure of processing for calculating the position and orientation in the second embodiment are the same as those of the first embodiment (FIGS. 1A, 1B, and 3).

In the second embodiment, in step S302, the prediction value calculation unit 120 estimates the magnitude of blurring and the magnitude of defocusing from a two-dimensional image obtained previously (previous time). The method of estimating the magnitudes of blurring and defocusing from a two-dimensional image is the same as the method for estimating the magnitudes of blurring and defocusing in an image edge feature part by the evaluation value calculation unit 150 in the first embodiment. Note that the magnitudes of blurring and defocusing are measured at, instead of the image edge feature part, a position at which a model feature is projected. For example, the prediction value calculation unit 120 projects a geometric model (for example, model edge features) of the object to be measured onto the two-dimensional image obtained previous time using the approximate position and orientation. Then, image degradation evaluation values at the projection positions are calculated using the method described in steps S601 and S602, and the calculated image degradation evaluation values are set as image degradation prediction values. Accordingly, an image degradation prediction value σ1 of a model edge feature that is obtained by the prediction value calculation unit 120 indicates the magnitude of blurring/defocusing at a coordinate position of a model feature (for example, a model edge feature) when the geometric model is projected onto the two-dimensional image.

The accuracy calculation unit 160 calculates the accuracies of image edge features found by the search unit 140, based on the image degradation prediction value obtained by the prediction value calculation unit 120 in step S302, and the image degradation evaluation value obtained by the evaluation value calculation unit 150 in step S305. Note that the image edge features found by the search unit 140 are correspondence candidates for the model edge features of the model of the object to be measured, and are stored as hypotheses in a memory (step S304). The accuracy T is calculated according to Formula 19 using the image degradation evaluation value σ of an image edge feature on the two-dimensional image that is held as a hypothesis that corresponds to a model edge feature of the model, and the image degradation prediction value σ1, which is a model edge feature in the model. Note that, when a plurality of hypotheses are detected for a correspondence between an image edge feature in the two-dimensional image and a model edge feature in the model, the accuracy T is calculated with respect to all of the edges serving as the candidates using Formula 19.

$$T=1/|\sigma_1^2-\sigma^2| \qquad \text{[Formula 19]}$$

As described above, in the second embodiment, the magnitudes of blurring and defocusing are calculated based on the previously measured two-dimensional image, and the association is performed with a high accuracy for the correspondence between features that are close in terms of the magnitudes of blurring and defocusing. Accordingly, it is possible to achieve correct collation between features.

Note that the prediction value calculation unit 120 in the second embodiment estimates the magnitude of blurring and the magnitude of defocusing from a two-dimensional image obtained previously (previous time), but the present invention is not limited to this. "The two-dimensional image obtained previously" may be a two-dimensional image in which, instead of an object to be measured, an object that can simulate it (hereafter, simulated object) is captured. Furthermore, the magnitudes of blurring and defocusing that were detected in advance at a plurality of positions/orientations on a two-dimensional image in which an object to be measured or a simulated object is captured may be put together in a table, and this table may be referenced. That is, the prediction value calculation unit 120 may obtain, by referencing this table, the magnitudes of blurring and defocusing that correspond to approximate position and orientation of the object to be measured as the image degradation prediction values. Furthermore, instead of the actually captured two-dimensional image, a computer generated (CG) image that is generated by two-dimensionally projecting a geometric model may be used to obtain an image degradation prediction value. When simulating the phenomenon of blurring/defocusing on such a CG image, a well-known method, for example, a method disclosed in Baba, Asada, and Amano, "Calibrated Computer Graphics: A New Approach to Image Synthesis Based on Camera Calibration" Transactions of Information Processing Society of Japan 39(7), 2180-2188, 1998, may be used.

As described above, with the method of the second embodiment, the accuracies of correspondences are calculated based on the magnitudes of blurring and defocusing using a previously measured two-dimensional image or a generated CG image, making it possible to achieve correct collation between a model feature and a measurement data feature.

Third Embodiment

In the first and second embodiments, the magnitudes of image blurring and defocusing that will occur in a two-dimensional image are estimated as image degradation prediction values ($\sigma 0$, $\sigma 1$), and are used for selection of association between image edge features obtained from a two-dimensional image and model edge features of a model. In a third embodiment, the image degradation prediction values are used for association between actually measured three-dimensional measurement points (hereafter, referred to as "three-dimensional points") and surface features of a three-dimensional model (hereafter, called a model surface feature). In the third embodiment, the selection for the association is performed with a high accuracy for a correspondence between features that are close in terms of the magnitudes of blurring and defocusing of model surface features on the two-dimensional image, and the magnitudes of blurring and defocusing on the two-dimensional image obtained by projecting the actually measured three-dimensional positions of the three-dimensional points onto the two-dimensional image.

Figure 10:
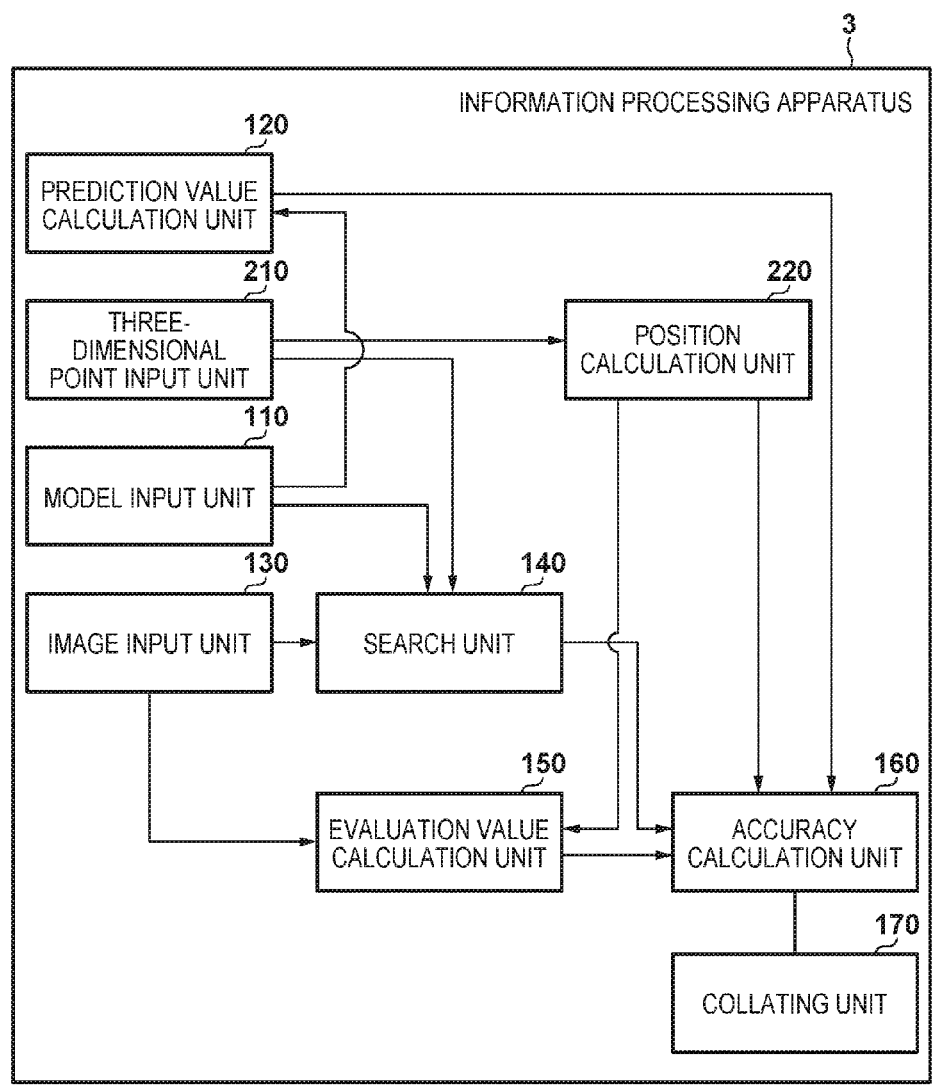
FIG. 10 is a diagram illustrating an example of a functional configuration of an information processing apparatus according to a third embodiment.

FIG. 10 is a diagram illustrating an example of a functional configuration of an information processing apparatus 3 according to the third embodiment. Note that the hardware configuration of the information processing apparatus 3 is the same as that shown in FIG. 1A. The information processing apparatus 3 includes, in addition to the configuration of the information processing apparatus 1, a three-dimensional point input unit 210 and a position calculation unit 220. Furthermore, the configuration of FIG. 10 is a configuration serving as an application example of the information processing apparatus of the present invention. The functions shown in FIG. 10 are realized by the CPU 101 executing the programs stored in the ROM 102, and/or, the programs expanded to the RAM 103 from the external storage device 105. Note that, it is apparent that a part or all of the functional units may be realized by dedicated hardware.

The three-dimensional point input unit 210 obtains three-dimensional coordinates of a point group on a surface of an object to be measured. In the third embodiment, three-dimensional coordinates of a three-dimensional point group that are obtained in advance by a distance sensor are obtained from an external storage device, but the present embodiment is not limited to this. For example, a three-dimensional point group that is obtained using a distance sensor (for example, a three-dimensional measurement device) may be input.

The position calculation unit 220 calculates the position of the three-dimensional coordinates of the point group input by the three-dimensional point input unit 210 on a two-dimensional image when the three-dimensional coordinates are projected onto the two-dimensional image. The position of the three-dimensional coordinates on the two-dimensional image is calculated based on the internal parameters of the capturing device that has captured the two-dimensional image, and the relative position and orientation between the capturing device and the distance sensor used for measuring the three-dimensional points. Note that calibration is performed in advance, assuming that the distance sensor and the capturing device are fixed to each other and the relative position and orientation of the two devices do not change. For example, a calibration object whose three-dimensional shape is known is observed in various directions, and the relative position and orientation between the distance sensor and the capturing device are obtained, based on a difference between the position and orientation of the calibration object based on a two-dimensional image, and the position and orientation of the calibration object based on a distance image.

Figure 2B:
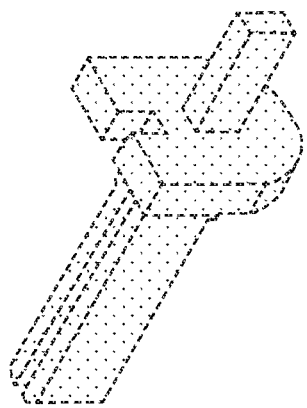
Figure 2C:
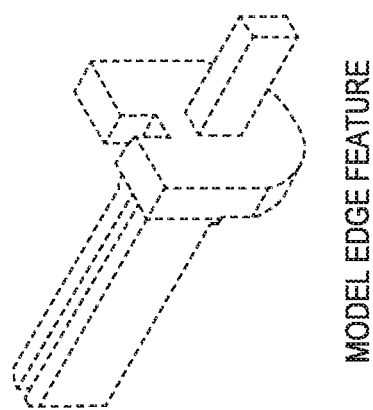

Note that the model that is input by the model input unit 110 in the third embodiment is assumed to be constituted by, as shown in FIG. 2B, information on local three-dimensional planes (model surface features) on the object surface, the information being constituted by the three-dimensional positions and the three-dimensional normal line directions. The prediction value calculation unit 120 calculates a degradation prediction value $\sigma 0$ of a model surface feature using the same method as that of the first embodiment.

The search unit 140 detects the correspondence between a two-dimensional image input by the image input unit 130, a three-dimensional point input by the three-dimensional point input unit 210, and a model surface feature of the geometric model input by the model input unit 110. In the association between the model surface feature and the three-dimensional point, a three-dimensional point in the vicinity of the model surface features is detected based on the approximate values of the positions and orientations of all of the model surface features constituting the model of the object to be measured that is input by the model input unit 110. In a case when there are a plurality of three-dimensional points in the vicinity, all of the detected three-dimensional points are held as hypotheses.

The evaluation value calculation unit 150 calculates, as an image degradation evaluation value $\sigma$, the magnitude of blurring/defocusing of each of the three-dimensional points calculated by the position calculation unit 220 at the positions on the two-dimensional image. The method of calculating the image degradation evaluation value $\sigma$ is the same as that of the first embodiment. The accuracy calculation unit 160 calculates the respective accuracies T of the correspondences between the model surface features of the model and features of three-dimensional points held as hypotheses to be associated, based on the image degradation prediction value $\sigma 0$ obtained by the prediction value calculation unit 120 and the image degradation evaluation value $\sigma$ obtained by the evaluation value calculation unit 150. The method of calculating the accuracy T is the same as that of the first embodiment.

In the third embodiment, the collating unit 170 selects, based on the accuracy calculated by the accuracy calculation unit 160, a three-dimensional point for use in collation from among the three-dimensional points that respectively correspond to the model surface features of the model of the object to be measured. Here, the pair having the highest accuracy T of a model surface feature and a three-dimensional point is selected, but the present embodiment is not limited to this. For example, it is also possible that if a pair having the highest accuracy T is selected, but the accuracy T is less than a threshold, the pair will not be used for collation. Similarly, it is also possible that if only one pair of a model surface feature and a three-dimensional point is detected, and it has an accuracy less than the threshold, the pair will not be used for collation. Also, the collating unit 170 calculates the position and orientation of the object to be measured based on the selected three-dimensional point. The method of calculating the position and orientation by the collating unit 170 can be the same as that of the first embodiment.

Note that, in the present embodiment, the distance sensor for use in the measurement of the three-dimensional points may be of an active-type, in which laser light is emitted to an object, reflected light is captured by a camera, and the distance is measured by triangulation. However, the distance sensor is not limited to this, and may be of a time-of-flight type that uses a flight time of light. Such active-type distance sensors are preferable in a case of an object whose surface has little texture. Furthermore, a passive-type distance sensor may be used that computes the depth of each pixel on an image captured by a stereo camera by triangulation. The passive-type distance sensor is preferable in a case of an object whose surface has sufficient texture. Furthermore, any sensor that measures a three-dimensional point does not impair the essence of the present invention.

As described above, the third embodiment has described a method in which collation between a model feature and a three-dimensional measurement point is performed with a high accuracy for a correspondence between features that are close in terms of the magnitudes of blurring and defocusing of model surface features on a two-dimensional image, and the magnitudes of blurring and defocusing on the two-dimensional image onto which an actually measured three-dimensional position of an three-dimensional point is projected. Accordingly, it is possible to achieve correct collation between a model feature and a three-dimensional measurement point.

Modification 2

In the third embodiment, the collating unit 170 selects a pair of a model surface feature and a three-dimensional point that has a high accuracy, and performs collation thereon, but the present embodiment is not limited to this. It is also possible that the accuracy of each correspondence between a model surface feature and a three-dimensional point is set as a weight for a three-dimensional point when the position and orientation are estimated. For example, similar to Modification 1, it is also possible that the degree of the accuracy is set as a weight for each three-dimensional point, and collation is performed based on this weighting. Similar to Modification 1, in this weighting method, the accuracy T of a correspondence between a model surface feature and a three-dimensional point is given to each diagonal element of the weight matrix W calculated by Formula 15. The correction value Δs for the position and orientation is obtained by performing calculation as Formula 17 using this weight matrix W, and the approximate values of the position and orientation are corrected. By the above-described method, it is possible to perform collation with a priority on a pair for which a high accuracy is calculated.

Note that the accuracy T itself is given as a value that is to be given to the diagonal element of the weight matrix W, but, similar to Modification 1, the value is not limited to this. Any value may be given as long as it gives a large weight to a pair having a high accuracy, and gives a small weight to a pair having a low accuracy.

As described above, Modification 2 has described a method in which, based on the magnitudes of image blurring and defocusing that are obtained on a two-dimensional image in which an object to be measured is captured, the accuracy of a correspondence is set as a weight for each feature of data, and collation between a model surface feature and a three-dimensional point is performed. Accordingly, it is possible to achieve highly accurate collation.

Modification 3

The method of calculating the defocusing magnitude in step S504 of the third embodiment may be as follows. As the magnitude of defocusing, a moving amount of each model surface feature in a three-dimensional space during an exposure time is used. Specifically, the Jacobian of each model surface feature is calculated based on an approximate position/orientation s of a geometric model, and the magnitude of defocusing of the model surface feature is calculated based on the Jacobian of the model surface feature and the relative moving direction/speed between the capturing device and the object to be measured that was input in step S502.

The Jacobian of the model surface feature refers to a value that represents the ratio of change in the model surface feature in a three-dimensional space when the six degrees of freedom parameters of position and orientation are slightly changed. Assume that a defocus amount of the three-dimensional point that corresponds to the model surface feature is represented by (dx, dy, dz), and the normal line direction of the model surface feature is represented by ($n_x$, $n_y$, $n_z$) (unit vector) based on the approximate position/orientation s of the object to be measured, a signed inter-correspondence distance err3D can be calculated by Formula 20.

$$\text{err}_{3D} = n_x dx + n_y dy + n_z dz \quad \text{[Formula 20]}$$

Similar to the Jacobian of model edge feature, by performing partial differentiation on the inter-correspondence distance $\text{err}_{3D}$ using the parameters of this position/orientation s, the Jacobian matrix of the model surface feature is calculated as Formula 21.

$$J_{3D} = \left[ \frac{\partial \text{err}_{3D}}{\partial s_1} \; \frac{\partial \text{err}_{3D}}{\partial s_2} \; \frac{\partial \text{err}_{3D}}{\partial s_3} \; \frac{\partial \text{err}_{3D}}{\partial s_4} \; \frac{\partial \text{err}_{3D}}{\partial s_5} \; \frac{\partial \text{err}_{3D}}{\partial s_6} \right] \quad \text{[Formula 21]}$$

As described above, a Jacobian of the feature of the projected local edge selected in step S502 is calculated. A distance change B between the model surface feature and the three-dimensional point can be calculated by Formula 22 using this Jacobian of the features of the projected local edge, the distance change B occurring due to the target object moving at the speed V with the relative position/orientation during an exposure time ti of the two-dimensional image.

$$B = t_i J_{3D} V \quad \text{[Formula 22]}$$

B is a scalar and represents the amount of movement of the three-dimensional position of the model surface feature in a three-dimensional space during the exposure time. The above-described processing is performed on all of the model surface features, and the defocus amounts with respect to all of the model surface features are calculated.

As described above, Modification 3 has described a method of calculating defocusing magnitude based on the moving amount of the model surface feature in a three-dimensional space. By using this method, it is possible to correctly obtain a prediction value of the defocus amount of a model feature.

Modification 4

The method of calculating a coefficient matrix and an error vector for use in calculating the position and orientation that is performed in step S803 of the third embodiment may be as follows.

Three-dimensional coordinates of a point group presented by camera coordinates are converted into three-dimensional coordinates (x, y, z) on a measurement target object coordinate system using the position and orientation of an object to be measured. It is assumed that a point in the point group data is converted into coordinates $(x_0, y_0, z_0)$ of the measurement target object by the approximate position and orientation. Coordinates (x, y, z) change depending on the position and orientation of the object to be measured, and are approximated by one-dimensional Taylor expansion in the vicinity of $(x_0, y_0, z_0)$ as Formula 23.

$$x \approx x_0 + \sum_{i=1}^{6} \frac{\partial x}{\partial s_i} \Delta s_i \quad \text{[Formula 23]}$$

$$y \approx y_0 + \sum_{i=1}^{6} \frac{\partial y}{\partial s_i} \Delta s_i$$

$$z \approx z_0 + \sum_{i=1}^{6} \frac{\partial z}{\partial s_i} \Delta s_i$$

An equation, in the measurement target object coordinate system, of the model surface feature that is associated with one of the points in the point group data is given as $ax+by+cz=e$ ($a^2+b^2+c^2=1$, where a, b, c, and e are constants). Coordinates (x, y, z) that are obtained using the correct s are assumed to satisfy the equation of the plane $ax+by+cz=e$. Formula 24 is obtained by substituting Formula 23 into the equation of the plane.

$$a \sum_{i=1}^{6} \frac{\partial x}{\partial s_i} \Delta s_i + b \sum_{i=1}^{6} \frac{\partial y}{\partial s_i} \Delta s_i + c \sum_{i=1}^{6} \frac{\partial z}{\partial s_i} \Delta s_i = e - q \quad \text{[Formula 24]}$$

$$q = ax_0 + by_0 + cz_0$$

Since Formula 24 is an equation for a small variation $\Delta s_i$ (i=1, 2, . . . , 6) in each element, a linear simultaneous equation relating to $\Delta s_i$ as Formula 25 can be formulated.

Here, Formula 25 is represented as Formula 13. Similar to the first and second embodiments, the position and orientation are calculated using the coefficient matrix J and the error vector E. Using the method of Modification 3 above, it is possible to more correctly calculate the position and orientation of an object to be measured.

Fourth Embodiment

In the first and second embodiments, the collation between model features and measurement data feature is performed only based on correspondences between a model edge feature and an image edge feature, and, in the third embodiment, the collation is performed only based on correspondences between a model surface feature and a three-dimensional point, but the present invention is not limited to these embodiments. The collation may be performed based on both correspondences between a model edge feature and an image edge feature, and correspondences between a model surface feature and a three-dimensional point. According to a method of the present embodiment, the accuracies of correspondences are calculated based on the magnitudes of image blurring and defocusing that are obtained on a two-dimensional image in which an object to be measured is captured, and thereby, it is possible to perform correctly both collation between an actually measured image edge feature and a model edge feature, and collation between a three-dimensional point and a model surface feature.

The configuration of the information processing apparatus according to the fourth embodiment is the same as that of the first, second, and third embodiments. Based on the accuracy of a correspondence between an image edge feature and a model edge feature, and the accuracy of a correspondence between a three-dimensional point and a model surface feature, which are calculated by the accuracy calculation unit 160, the collating unit 170 of the fourth embodiment selects image edge features and three-dimensional points that are to be used for collation from image edge features and three-dimensional points that correspond to each model edge feature and model surface feature of a model of an object to be measured. The coefficient matrix and the error vector for use in calculating the position and orientation are calculated based on a correspondence that is to be selected next. In the present embodiment, since the position and orientation are obtained using both image edge features and three-dimensional points, a linear simultaneous equation relating to $\Delta s_i$ as given in Formula 26 can be formulated by combining Formula 12 and Formula 25.

$$\begin{bmatrix} a_1 \frac{\partial x}{\partial s_1} + b_1 \frac{\partial y}{\partial s_1} + c_1 \frac{\partial z}{\partial s_1} & a_1 \frac{\partial x}{\partial s_2} + b_1 \frac{\partial y}{\partial s_2} + c_1 \frac{\partial z}{\partial s_2} & \cdots & a_1 \frac{\partial x}{\partial s_6} + b_1 \frac{\partial y}{\partial s_6} + c_1 \frac{\partial z}{\partial s_6} \\ a_2 \frac{\partial x}{\partial s_1} + b_2 \frac{\partial y}{\partial s_1} + c_2 \frac{\partial z}{\partial s_1} & a_2 \frac{\partial x}{\partial s_2} + b_2 \frac{\partial y}{\partial s_2} + c_2 \frac{\partial z}{\partial s_2} & \cdots & a_2 \frac{\partial x}{\partial s_6} + b_2 \frac{\partial y}{\partial s_6} + c_2 \frac{\partial z}{\partial s_6} \\ \vdots & \vdots & \vdots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \quad \text{[Formula 25]}$$

$$\begin{bmatrix} e_1 - q_1 \\ e_2 - q_2 \\ \vdots \end{bmatrix}$$

$$\begin{bmatrix} \sin\theta_1 \frac{\partial u}{\partial s_1} - \cos\theta_1 \frac{\partial v}{\partial s_1} & \sin\theta_1 \frac{\partial u}{\partial s_2} - \cos\theta_1 \frac{\partial v}{\partial s_2} & \cdots & \sin\theta_1 \frac{\partial u}{\partial s_6} - \cos\theta_1 \frac{\partial v}{\partial s_6} \\ \sin\theta_2 \frac{\partial u}{\partial s_1} - \cos\theta_1 \frac{\partial v}{\partial s_1} & \sin\theta_2 \frac{\partial u}{\partial s_2} - \cos\theta_1 \frac{\partial v}{\partial s_2} & \cdots & \sin\theta_2 \frac{\partial u}{\partial s_6} - \cos\theta_2 \frac{\partial v}{\partial s_6} \\ \vdots & \vdots & \ddots & \vdots \\ a_1 \frac{\partial x}{\partial s_1} + b_1 \frac{\partial y}{\partial s_1} + c_1 \frac{\partial z}{\partial s_1} & a_1 \frac{\partial x}{\partial s_2} + b_1 \frac{\partial y}{\partial s_2} + c_1 \frac{\partial z}{\partial s_2} & \cdots & a_1 \frac{\partial x}{\partial s_6} + b_1 \frac{\partial y}{\partial s_6} + c_1 \frac{\partial z}{\partial s_6} \\ a_2 \frac{\partial x}{\partial s_1} + b_2 \frac{\partial y}{\partial s_1} + c_2 \frac{\partial z}{\partial s_1} & a_2 \frac{\partial x}{\partial s_2} + b_2 \frac{\partial y}{\partial s_2} + c_2 \frac{\partial z}{\partial s_2} & \cdots & a_2 \frac{\partial x}{\partial s_6} + b_2 \frac{\partial y}{\partial s_6} + c_2 \frac{\partial z}{\partial s_6} \\ \vdots & \vdots & \vdots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} =$$

[Formula 26]

$$\begin{bmatrix} d_1 - r_1 \\ d_2 - r_2 \\ \vdots \\ e_1 - q_1 \\ e_2 - q_2 \\ \vdots \end{bmatrix}$$

Here, Formula 26 is expressed as Formula 13. The position and orientation are calculated by the same method as in the first, second, and third embodiments, using the coefficient matrix J and the error vector E.

The method is not limited to this, and it is also possible that, as described in Modifications 1 and 2, the degree of the accuracy is set as a weight for each three-dimensional point, and collation is performed based on this weighting. It is possible not only that the accuracy T itself is given, but also, any value may be used, as with in Modifications 1 and 2, as long as it gives a large weight to a pair having a high accuracy, and gives a small weight to a pair having a low accuracy.

By using the above-described method of the fourth embodiment, it is possible to perform collation based on both a correspondence between a model edge feature and an image edge feature, and a correspondence between a model surface feature and a three-dimensional point. According to the method of the present embodiment, it is possible to perform collation between a model feature and measured data more correctly than the case when collation is performed using either of the correspondences.

Fifth Embodiment

The following will describe a preferred application example of the information processing apparatuses 1 and 3. That is, a usage example is considered in which the position and orientation of an object to be measured are estimated based on a two-dimensional image obtained by a capturing device, and the object is held by an industrial robot arm. Hereafter, an example in which the information processing apparatus 1 or 3 is applied to a robot system will be described with reference to FIG. 11. FIG. 11 is a diagram illustrating an example of a configuration of the robot system in which a measurement object 40 (object to be measured) is held by a robot 60 based on an estimation result of the position and orientation by the information processing apparatus 1 or 3.

The robot 60 has a movable shaft that is constituted by, for example, a rotation and/or translation movement shaft, and the movable shaft is drive-controlled by the robot controller 61. For example, the robot 60 moves its hand to the position instructed by the robot controller 61, and holds the object, for example. The position of the measurement object 40 on a workbench is changed, and thus, it is necessary to estimate the current position and orientation of the measurement object 40 and to perform holding control of the robot. The capturing device 20 is an ordinary camera that captures a two-dimensional image, and is installed at a position to be able to capture the measurement object 40, such as an end of the hand of the industrial robot arm. The information processing apparatus 1 or 3 estimates the position and orientation of the measurement object 40 based on the two-dimensional image obtained from the capturing device 20. The position and orientation of the measurement object 40 that were estimated by the information processing apparatus 1 or 3 are input to the robot controller 61, and the robot controller 61 controls the robot arm so as to perform, for example, holding of the measurement object 40 based on the input estimation result of the position and orientation.

As described above, according to the robot system of the fifth embodiment, the estimation result of the position and orientation of the measurement object 40 can be obtained from the information processing apparatus 1 or 3 that performs more accurate estimation of the position and orientation. Therefore, the robot 60 can hold the measurement object 40 more reliably.

As described above, according to the first embodiment, it is possible to correctly collate model features with measurement data features, by calculating the accuracy of a correspondence based on the magnitudes of image blurring and defocusing that are obtained from a two-dimensional image in which an object to be measured is captured. Furthermore, according to the third embodiment, it is possible to correctly collate actually measured three-dimensional points with model surface features of a three-dimensional geometric model, by calculating the accuracy of a correspondence based on the magnitudes of image blurring and defocusing that are obtained from a two-dimensional image in which an object to be measured is captured. According to the fourth embodiment, it is possible to correctly perform collation between image edge features of a two-dimensional image and model edge features of a three-dimensional geometric model, and collation between actually measured three-dimensional points and model surface features of a three-dimensional geometric model at the same time, by calculating the accuracy of a correspondence based on the magnitudes of image blurring and defocusing that are obtained from a two-dimensional image in which an object to be measured is captured. Furthermore, according to the second embodiment, it is possible to correctly collate model features with measurement data features, by calculating the accuracy of a correspondence based on the magnitudes of blurring and defocusing that were obtained in advance using a two-dimensional image that was previously a measurement target or using a previously generated CG image. Furthermore, according to the fifth embodiment, the position and orientation of an object to be measured can be estimated, and the robot system can hold and move the object to be measured based on the estimation result.

Note that geometry information that is input as a geometric model of an object to be measured may be expressed by a set of simple two-dimensional points, a set of two-dimensional lines, or the like, or by polygonal geometric information such as a set of simple three-dimensional points, a set of three-dimensional lines representing edge lines, or three three-dimensional points.

Furthermore, in the prediction value calculation unit, the magnitude of blurring due to being out of focus, and the magnitude of defocusing due to parallel translation on an image plane are used as an image degradation prediction value, but the image degradation prediction value is not limited to those. Any value may be used as long as it can represent the amount of degradation of a two-dimensional image due to the relative movement between the capturing device and an object to be measured, and the calculation method and expression are not particularly limited. For example, the magnitude of defocusing of image edge features of a two-dimensional image in which an object to be measured is captured may be represented as a moving amount in a three-dimensional space that is calculated by being back-projected onto the three-dimensional space. Furthermore, a point spread function (PSF) generated based on the magnitude of blurring and the magnitude of defocusing may be used as an image degradation evaluation value. Instead of a prediction value taking into consideration an effect of both blurring and defocusing, a prediction value taking into consideration an effect of only one of them may be used.

A two-dimensional image, in which an object to be measured is captured and that is input by the image input unit may be of any type as long as the target image, is included. For example, the two-dimensional image may be a grayscale image or a color image. In the present invention, a two-dimensional image captured in advance is input, but the present invention is not limited to this. A captured result by a capturing device may be input. A measurement data feature that serves as a correspondence candidate to be found by the search unit 140 may be an image edge feature, or any feature, such as a point feature, may be used as long as it can specify the position on the two-dimensional image. Furthermore, not only a specified type of features is used, but also, a correspondence between a plurality of types of features (for example, points and edges) and a model feature may be detected.

The evaluation value calculation unit calculates an image degradation evaluation value of each image edge feature, for example, by applying a function indicating a change in brightness of an edge of a two-dimensional image when blurring/defocusing occurs to a change in brightness of pixels in a direction orthogonal to the edge. Here, as the function indicating a change in brightness, instead of the error function as Formula 6, a Gaussian function, or the like, may be used. Furthermore, in the above-described embodiment, a degradation evaluation value is calculated in units of a feature such as a corresponding point that corresponds to a control point, or a position at which a three-dimensional point is projected, but the present invention is not so limited. For example, a two-dimensional image may be divided into square partial regions, and a degradation evaluation value may be calculated for each partial region.

The calculating method used by the accuracy calculation unit needs to be a method in which a small accuracy is set when the difference between an image degradation evaluation value ($\sigma$) and image degradation prediction values ($\sigma 0$, $\sigma 1$) is large, and a large accuracy is set when the difference between an image degradation evaluation value and an image degradation prediction value is small. For example, instead of a calculation method as given in Formula 8, calculation using a Gaussian function, a Tukey function, a Huber function, or the like, may be performed.

The collating unit selects a pair of a model feature and an image feature that has an accuracy equal to or greater than a predetermined threshold, and performs collation thereon. Even if only one pair is detected, and it has an accuracy less than the threshold, this pair does not need to be used for collation. However, the present invention is not limited to this. Weighting may be performed such that a pair having a higher accuracy is used with priority for the collation processing. At this time, any value that is to be given for weighting may be used, as long as it gives a large weight to a pair having a high accuracy, and gives a small weight to a pair having a low accuracy. Furthermore, the collating unit may calculate the position and orientation of an object to be measured, or may hold the positions of model features at a plurality of positions and orientations in advance, collate the model features with measurement data features using pattern matching, and identify the approximate position and orientation, or specify the type of the object.

According to the above-described embodiment, it is possible to realize a highly accurate correspondence between model features of a geometric model of an object to be measured and measurement data feature on a two-dimensional image. Accordingly, it is possible to realize highly accurate estimation of, for example, the position and orientation of an object to be measured.

Other Embodiments

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be pro-

What is claimed is:

1. An information processing apparatus comprising:
   (A) at least one memory storing computer executable instructions; and
   (B) at least one processor configured to execute the computer executable instructions to implement:
      (a) a prediction unit configured to predict, based on a geometric model representing a shape of an object to be measured, an image degradation of the object to be measured in an image in which the object to be measured is captured by a capturing device;
      (b) a searching unit configured to search a two-dimensional image in which the object to be measured is captured by the capturing device for a measurement data feature that corresponds to a model feature of the geometric model;
      (c) an evaluation unit configured to evaluate, using the two-dimensional image, an image degradation with respect to the measurement data feature found by the searching unit;
      (d) a calculation unit configured to calculate, based on the image degradation predicted by the prediction unit and the image degradation evaluated by the evaluation unit, an accuracy of the correspondence between the model feature and the measurement data feature; and
      (e) a collation unit configured to collate, based on the accuracy of the correspondence between the model feature and the measurement data feature, the geometric model and the object to be measured in the two-dimensional image.

2. The apparatus according to claim 1, wherein the image degradation is an image degradation that is caused by image spread due to at least one of blurring and defocusing of the two-dimensional image.

3. The apparatus according to claim 1, wherein the evaluation unit evaluates the image degradation by applying an error function to the measurement data feature of the two-dimensional image.

4. The apparatus according to claim 1, wherein the prediction unit predicts the image degradation based on at least one of the geometric model, a given position and orientation of the object to be measured, a change in relative position and orientation between the object to be measured and the capturing device, and an internal parameter of the capturing device.

5. The apparatus according to claim 1, wherein the prediction unit obtains an image degradation at a coordinate position of a model feature of an image that is obtained in advance by capturing the object to be measured or an object that simulates the object to be measured, the image degradation occurring when the geometric model is projected onto the image obtained in advance.

6. The apparatus according to claim 1, wherein the prediction unit obtains an image degradation based on a computer generated (CG) image generated by two-dimensionally projecting the geometric model of the object to be measured.

7. The apparatus according to claim 1, wherein the calculation unit calculates the accuracy so as to take a higher value the closer a degree of the image degradation predicted by the prediction unit and a degree of the image degradation evaluated by the evaluation unit are to each other.

8. The apparatus according to claim 1, wherein the collation unit selects a correspondence between the model feature and the measurement data feature based on the accuracy.

9. The apparatus according to claim 8, wherein the collation unit selects a correspondence for which a higher accuracy has been calculated by the calculation unit with priority.

10. The apparatus according to claim 1, wherein the collation unit sets a weight relating to the measurement data feature based on the accuracy.

11. The apparatus according to claim 1, wherein the collation unit is a unit configured to calculate at least one of a position and an orientation of the object to be measured in a three-dimensional space.

12. The apparatus according to claim 1, wherein the at least one processor is configured to execute the computer readable instructions to further implement:
   (f) the capturing device; and
   (g) an acquiring unit configured to acquire the two-dimensional image obtained by the capturing device capture capturing the object to be measured.

13. An information processing apparatus comprising:
   (A) at least one memory storing computer executable instructions; and
   (B) at least one processor configured to execute the computer executable instructions to implement:
      (a) a prediction unit configured to predict, based on a geometric model representing a shape of an object to be measured, an image degradation of the object to be measured in an image in which the object to be measured is captured by a capturing device;
      (b) an obtaining unit configured to obtain three-dimensional coordinates of a three-dimensional measurement point on a surface of the object to be measured;
      (c) an evaluation unit configured to evaluate, based on the three-dimensional coordinates obtained by the obtaining unit, an image degradation at a position of a point group projected onto a two-dimensional image captured by the capturing device;
      (d) a searching unit configured to search for a correspondence between the three-dimensional measurement point and a model feature of the geometric model;
      (e) a calculation unit configured to calculate, based on the image degradation predicted by the prediction unit and the image degradation evaluated by the evaluation unit, an accuracy of the correspondence between the model feature and the three-dimensional measurement point; and
      (f) a collation unit configured to collate, based on the accuracy of the correspondence between the model feature and the three-dimensional measurement point, the geometric model and three-dimensional measurement points representing the shape of the object to be measured.

14. The apparatus according to claim 13, wherein the at least one processor is configured to execute the computer executable instructions to further implement:
(g) a measurement device configured to measure the three-dimensional coordinates of the three-dimensional measurement point,
wherein the obtaining unit obtains the three-dimensional coordinates from the measurement device.

15. The apparatus according to claim 1, wherein the at least one processor is configured to execute the computer executable instructions to further implement:
(f) a control unit configured to control a robot arm based on an estimation result of a position and an orientation of the object to be measured that is estimated by the collation unit.

16. A method of controlling an information processing apparatus, the method comprising:
predicting, based on a geometric model representing a shape of an object to be measured, an image degradation of the object to be measured in an image in which the object to be measured is captured by a capturing device;
searching a two-dimensional image in which the object to be measured is captured by the capturing device for a measurement data feature that corresponds to a model feature of the geometric model;
evaluating, using the two-dimensional image, an image degradation with respect to the found measurement data feature;
calculating, based on the predicted image degradation and the evaluated image degradation, an accuracy of the correspondence between the model feature and the measurement data feature; and
collating, based on the accuracy of the correspondence between the model feature and the measurement data feature, the geometric model and the object to be measured in the two-dimensional image.

17. A method of controlling an information processing apparatus, the method comprising:
predicting, based on a geometric model representing a shape of an object to be measured, an image degradation of the object to be measured in an image in which the object to be measured is captured by a capturing device;
obtaining three-dimensional coordinates of a three-dimensional measurement point on a surface of the object to be measured;
evaluating, based on the obtained three-dimensional coordinates, an image degradation at a position of a point group projected onto a two-dimensional image captured by the capturing device;
searching for a correspondence between the three-dimensional measurement point and a model feature of the geometric model;
calculating, based on the predicted image degradation and the evaluated image degradation, an accuracy of the correspondence between the model feature and the three-dimensional measurement point; and
collating, based on the accuracy of the correspondence between the model feature and the three-dimensional measurement point, the geometric model and three-dimensional measurement points representing the shape of the object to be measured.

18. A non-transitory computer readable storage medium having stored therein a program for causing a computer to execute a method including:
predicting, based on a geometric model representing a shape of an object to be measured, an image degradation of the object to be measured in an image in which the object to be measured is captured by a capturing device;
searching a two-dimensional image in which the object to be measured is captured by the capturing device for a measurement data feature that corresponds to a model feature of the geometric model;
evaluating, using the two-dimensional image, an image degradation with respect to the found measurement data feature;
calculating, based on the predicted image degradation and the evaluated image degradation, an accuracy of the correspondence between the model feature and the measurement data feature; and
collating, based on the accuracy of the correspondence between the model feature and the measurement data feature, the geometric model and the object to be measured in the two-dimensional image.

19. A non-transitory computer readable storage medium having stored therein a program for causing a computer to execute a method including:
predicting, based on a geometric model representing a shape of an object to be measured, an image degradation of the object to be measured in an image in which the object to be measured is captured by a capturing device;
obtaining three-dimensional coordinates of a three-dimensional measurement point on a surface of the object to be measured;
evaluating, based on the obtained three-dimensional coordinates, an image degradation at a position of a point group projected onto a two-dimensional image captured by the capturing device;
searching for a correspondence between the three-dimensional measurement point and a model feature of the geometric model;
calculating, based on the predicted image degradation and the evaluated image degradation, an accuracy of the correspondence between the model feature and the three-dimensional measurement point; and
collating, based on the accuracy of the correspondence between the model feature and the three-dimensional measurement point, the geometric model and three-dimensional measurement points representing the shape of the object to be measured.

* * * * *